United States Patent
Jitsukawa

(10) Patent No.: US 9,622,185 B2
(45) Date of Patent: Apr. 11, 2017

(54) WIRELESS COMMUNICATION METHOD, WIRELESS COMMUNICATION SYSTEM, WIRELESS STATION, AND WIRELESS TERMINAL FOR ADJUSTING TRANSMISSION POWER

(71) Applicant: FUJITSU LIMITED, Kawasaki-shi, Kanagawa (JP)

(72) Inventor: Daisuke Jitsukawa, Adachi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/722,803

(22) Filed: May 27, 2015

(65) Prior Publication Data

US 2015/0304959 A1   Oct. 22, 2015

Related U.S. Application Data

(63) Continuation of application No. PCT/JP2012/008101, filed on Dec. 19, 2012.

(51) Int. Cl.
*H04B 7/00* (2006.01)
*H04W 52/16* (2009.01)
(Continued)

(52) U.S. Cl.
CPC ........... *H04W 52/16* (2013.01); *H04L 5/0035* (2013.01); *H04L 5/0053* (2013.01); *H04W 16/28* (2013.01);
(Continued)

(58) Field of Classification Search
CPC ..... H04W 28/18; H04W 36/16; H04W 36/24; H04W 40/24; H04W 40/244;
(Continued)

(56) References Cited

U.S. PATENT DOCUMENTS

| 2012/0039274 A1* | 2/2012 | Tsuruoka | H04L 5/0005 370/329 |
| 2012/0063416 A1* | 3/2012 | Kobayashi | H04W 48/20 370/331 |

(Continued)

FOREIGN PATENT DOCUMENTS

| JP | 2011-009866 A | 1/2011 |
| JP | 2013-42310 A | 2/2013 |

OTHER PUBLICATIONS

Extended European search report with the supplementary European search report and European search opinion dated Oct. 5, 2015 issued for corresponding European Patent Application No. 12890496.8.

(Continued)

*Primary Examiner* — Shaima Q Aminzay
(74) *Attorney, Agent, or Firm* — Myers Wolin, LLC.

(57) ABSTRACT

A wireless communication method including: transmitting a first control signal from a connected wireless station to a wireless terminal, the connected wireless station being one of a plurality of wireless stations that is connected to the wireless terminal, the first control signal relating to a communication level between the wireless terminal and at least one wireless station that is selected from among the plurality of the wireless station, and controlling, by the wireless terminal that receives the first control signal, a transmission power of a transmission signal to the selected at least one wireless station based on the received first control signal.

9 Claims, 13 Drawing Sheets

(51) Int. Cl.

| | |
|---|---|
| *H04W 16/28* | (2009.01) |
| *H04W 52/40* | (2009.01) |
| *H04W 52/24* | (2009.01) |
| *H04W 52/14* | (2009.01) |
| *H04L 5/00* | (2006.01) |
| *H04W 72/04* | (2009.01) |
| *H04B 7/024* | (2017.01) |
| *H04J 11/00* | (2006.01) |
| *H04W 52/10* | (2009.01) |
| *H04W 92/20* | (2009.01) |

(52) U.S. Cl.
CPC ....... *H04W 52/146* (2013.01); *H04W 52/242* (2013.01); *H04W 52/243* (2013.01); *H04W 52/40* (2013.01); *H04W 72/0406* (2013.01); *H04B 7/024* (2013.01); *H04J 11/0053* (2013.01); *H04W 52/10* (2013.01); *H04W 52/241* (2013.01); *H04W 52/245* (2013.01); *H04W 92/20* (2013.01)

(58) Field of Classification Search
CPC ..... H04W 48/08; H04W 48/16; H04W 48/20; H04W 52/04; H04W 52/10; H04W 52/146; H04W 52/16; H04W 52/225; H04W 52/228; H04W 52/241; H04W 52/242; H04W 52/243; H04W 52/245
USPC ........................................................ 455/522
See application file for complete search history.

(56) References Cited

U.S. PATENT DOCUMENTS

| | | | |
|---|---|---|---|
| 2012/0127911 A1 | 5/2012 | Nishikawa et al. | |
| 2012/0238305 A1 | 9/2012 | Xiao et al. | |
| 2012/0302172 A1 | 11/2012 | Falconetti et al. | |
| 2013/0040675 A1* | 2/2013 | Ant ..................... | H04W 52/226 455/509 |
| 2014/0179363 A1 | 6/2014 | Nishikawa et al. | |
| 2014/0219152 A1* | 8/2014 | Ant ...................... | H04W 52/08 370/311 |

OTHER PUBLICATIONS

Huawei et al., "Power control design for UL CoMP scenario 3 and 4", Agenda Item: 7.5.4.2, R1-113648, 3GPP TSG RAN WG1 Meeting #67, 3rd Generation Partnership Project (3GPP), San Francisco, CA (US), Nov. 14-18, 2011.

International Search Report issued for corresponding International Patent Application No. PCT/JP2012/008101, mailed Feb. 5, 2013.

Alcatel-Lucent Shanghai Bell et al., "Discussion on Fractional Power Control Enhancement for UL CoMP", Agenda Item: 7.5.6.2, 3GPP TSG-RAN WG1 Meeting #68, R1-120501, Dresden, Germany, Feb. 6-10, 2012.

Intel Corporation, "A Signaling Framework for UL CoMP", Agenda Item: 7.5.6.3, 3GPP TSG-RAN WG1 Meeting #68, R1-120206, Dresden, Germany, Feb. 6-10, 2012.

Notice of Preliminary Rejection issued by the Korean Intellectual Property Office for corresponding Korean Patent Application No. 10-2015-7015872, mailed on Jun. 27, 2016, with English translation.

QUALCOMM Incorporated, "Uplink power control issues in CoMP", Agenda Item: 7.5.6.2, 3GPP TSG-RAN WG1 Meeting #68, R1-120556, Dresden, Germany, Feb. 6-10, 2012.

Samsung, "Discussions on UL Power Control for UL CoMP", Agenda Item: 7.5.4.3, 3GPP TSG-RAN WG1 Meeting #66bis, R1-113096, Zhuhai, China, Oct. 10-14, 2011.

Notification of Reasons for Refusal issued by the Japan Patent Office for corresponding Japanese Patent Application No. 2014-552752, mailed on Sep. 6, 2016, with a partial English translation.

NTT Docomo, "Views on UL power control for HetNet scenario", Agenda Item: 6.5.2, 3GPP TSG-RAN WG1 Meeting π66, R1-112432, Athens, Greece, Aug. 22-26, 2011.

3GPP TS 36211 V105.0, 3rd Generation Partnership Project; Technical Specification Group Radio Access Network; Evolved Universal Terrestrial Radio Access (E-UTRA); Physical Channels and Modulation (Release 10), Jun. 2012. Relevant Sections 5.3.4 "Mapping to physical resources", 5.4.3 "Mapping to physical resources", and 5.5.3.2 "Mapping to physical resources".

3GPP TR 36.814 V9.0.0, 3rd Generation Partnership Project; Technical Specification Group Radio Access Network; Evolved Universal Terrestrial Radio Access (E-UTRA); Further advancements for E-UTRA physical layer aspects (Release 9), Mar. 2010. Relevant Section 8 "Coordinated multiple point transmission and reception".

* cited by examiner

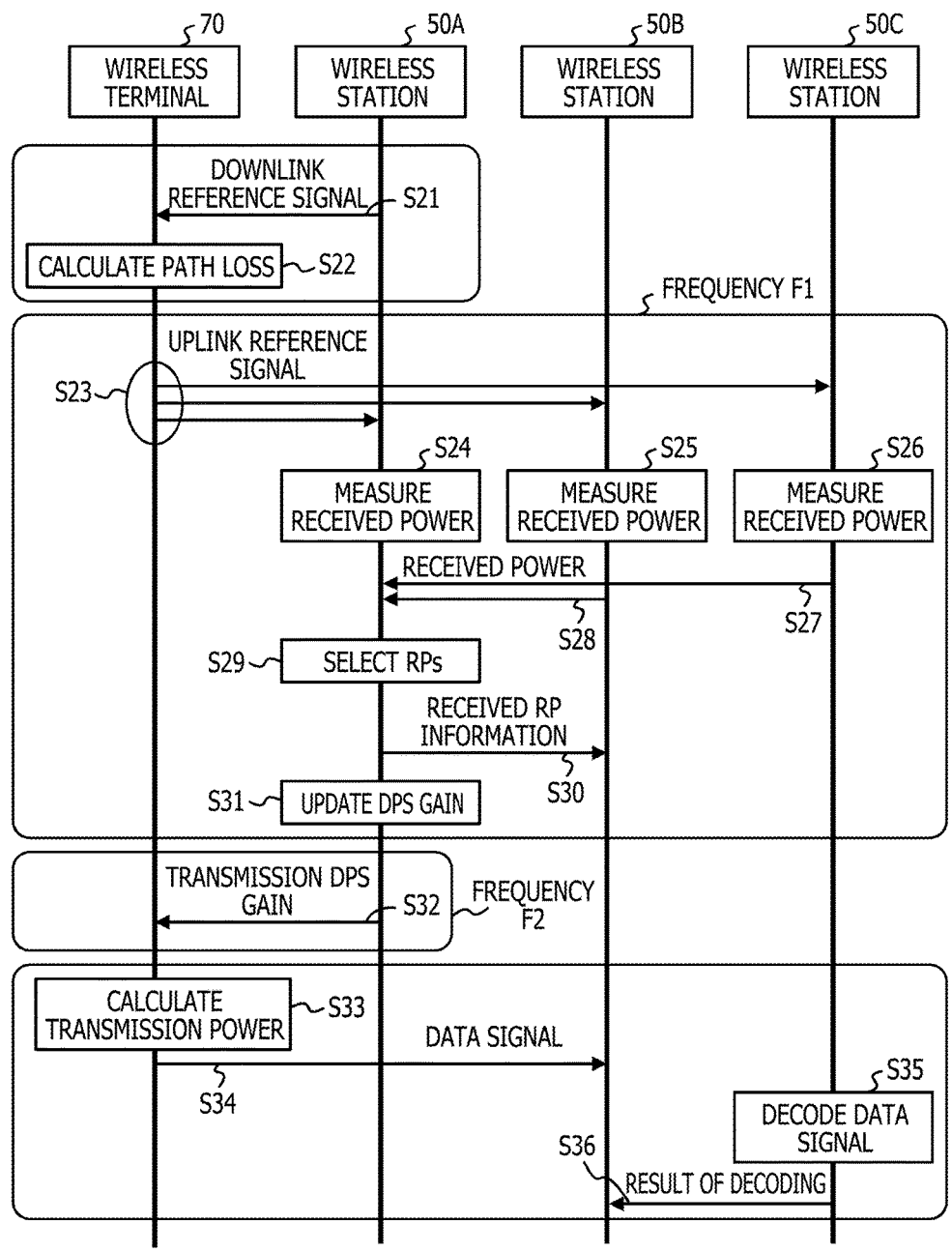

WIRELESS COMMUNICATION METHOD, WIRELESS COMMUNICATION SYSTEM, WIRELESS STATION, AND WIRELESS TERMINAL FOR ADJUSTING TRANSMISSION POWER

CROSS-REFERENCE TO RELATED APPLICATION

This application is a continuation application of International Application PCT/JP2012/008101 filed on Dec. 19, 2012, the entire contents of which are incorporated herein by reference.

FIELD

The present invention relates to a wireless communication method, a wireless communication system, a wireless station, and a wireless terminal.

BACKGROUND

In recent years, in order to further increase the speed of wireless communication and a capacity for wireless communication in a wireless communication system such as a mobile phone system, a next-generation wireless communication technique has been under discussion. For example, the 3rd Generation Partnership Project (3GPP) that is a standards organization has proposed the communication standard called Long Term Evolution (LTE) and the communication standard called LTE-Advanced (LTE-A) based on the wireless communication technique for LTE.

For LTE-A systems or the like, coordinated multipoint (hereinafter also referred to as CoMP) communication has been considered in order to reduce inter-cell interference and improve the strength of a signal to be received. In the coordinated multipoint communication, multiple communication points that are geographically separated from each other coordinate and communicate with each other. The communication points correspond to cells that are each formed by a base station, a communication unit, an antenna, or them, for example. This adjusts transmission or reception at the multiple points. For example, for downlink coordinated multipoint communication, a method for executing joint transmission from multiple communication points to a wireless terminal has been considered. In addition, for example, for uplink coordinated multipoint communication, a method for dynamically selecting a point to be used for reception from among multiple points, and a method for executing joint processing on a signal received by multiple points while communicating the signal between the points, have been considered.

CITATION LIST

Non Patent Literature

Non Patent Literature 1: 3GPP TS36.211 V10.2.0 (2011-06)
Non Patent Literature 2: 3GPP TS36.814 V9.0.0 (2010-03)

SUMMARY

According to an aspect of the invention, a wireless communication method includes transmitting a first control signal from a connected wireless station to a wireless terminal, the connected wireless station being one of a plurality of wireless stations that is connected to the wireless terminal, the first control signal relating to a communication level between the wireless terminal and at least one wireless station that is selected from among the plurality of the wireless station, and controlling, by the wireless terminal that receives the first control signal, a transmission power of a transmission signal to the selected at least one wireless station based on the received first control signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a sequence diagram describing operations of the wireless communication system according to the second embodiment;

DESCRIPTION OF EMBODIMENTS

However, in order to achieve, by the coordinated multipoint communication, a reduction in inter-point interference and the improvement of the strength of a signal to be received, appropriate adjustment is to be executed between points in consideration of a delay of control and an increase in signaling. For example, it is expected that, in uplink coordinated multipoint communication, a receiving point to be actually used for signal reception is adjusted from a communication point that is able to execute the coordinated communication. There is a possibility that many communication points that are able to execute the coordinated communication may exist and the number of receiving points to be actually used and a combination of the receiving points may vary. In this case, unless transmission power of a signal to be transmitted from a wireless terminal is appropriately adjusted, the improvement of communication performance may be inhibited depending on the receiving points to be used.

The technique disclosed herein has been devised in view of the above description, and an object of the technique disclosed herein is to provide a wireless communication method, a wireless communication system, a wireless station, and a wireless terminal that make it possible to appropriately adjust transmission power of a signal to be transmitted from the wireless terminal and improve communication performance in coordinated multipoint communication.

Hereinafter, a wireless communication method, a wireless communication system, a wireless station, and a wireless terminal that are disclosed herein are described with reference to the accompanying drawings. The wireless communication method, the wireless communication system, the wireless station, and the wireless terminal that are disclosed herein are not limited by the following embodiments.

First Embodiment

Figure 1:
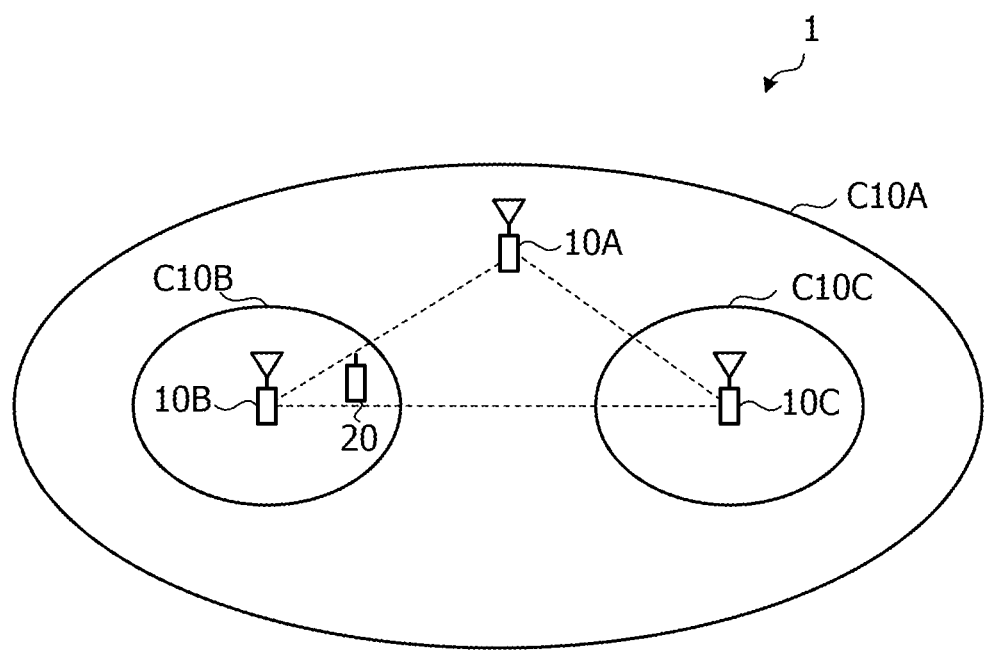
FIG. 1 is a diagram illustrating a configuration of a wireless communication system according to a first embodiment.

FIG. 1 illustrates a configuration of a wireless communication system 1 according to the first embodiment. As illustrated in FIG. 1, the wireless communication system 1 includes wireless stations 10A to C and a wireless terminal 20. The wireless stations 10A to C have antennas, respectively, and are installed at points separated from each other. The wireless stations 10A to C correspond to communication points. The wireless station 10A forms a cell C10A, while the wireless stations 10B and 10C form cells C10B and C10C, respectively. The cells C10B and C10C overlap the cell C10A.

The wireless stations 10A to C communicate with each other through wired or wireless connections between the wireless stations 10A to C. In addition, the wireless stations 10A to C may execute CoMP communication with the wireless terminal 20. For example, in downlink CoMP communication with the wireless terminal 20, one or more communication points that are selected from among the wireless stations 10A to C as a set to be used in downlink CoMP communication execute joint transmission so as to transmit, to the wireless terminal 20, data using a wireless resource of the same frequency at the same time. In addition, for example, in uplink CoMP communication with the wireless terminal 20, one or more communication points that are selected from among the wireless stations 10A to C as a set to be used in uplink CoMP communication execute joint reception so as to receive data from the wireless terminal 20 and combine received signals between the communication points.

In the example illustrated in FIG. 1, the cells C10B and C10C formed by the wireless stations 10B and 10C are included in the cell C10A formed by the wireless station 10A, but the cells are not limited to this. It is sufficient if the wireless stations 10A to C are able to execute CoMP communication.

In addition, for example, the wireless stations 10A to C are connected to a network device through wired or wireless connections, and the network device is connected to a network through a wired or wireless connection. The wireless stations 10A to C are installed and each able to transmit and receive data and control information to and from the other wireless stations through the network device or the network.

Figure 2:
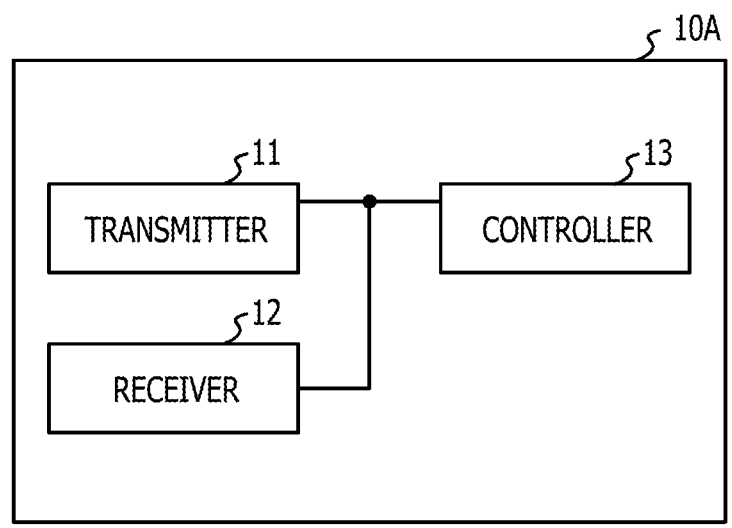
FIG. 2 is a functional block diagram illustrating a configuration of a wireless station according to the first embodiment.

FIG. 2 is a functional block diagram illustrating a configuration of the wireless station 10A. As illustrated in FIG. 2, the wireless station 10A includes a transmitter 11, a receiver 12, and a controller 13. These constituent parts are each connected to the other parts uni-directionally or bi-directionally so as to be able to receive and output data from and to the other parts. Functional configurations and hardware configurations of the wireless stations 10B and 10C are the same as or similar to a functional configuration and hardware configuration of the wireless station 10A.

The transmitter 11 transmits a data signal and a control signal through the antenna. The antenna may be common to transmission and reception or may be antennas separated for transmission and reception. The transmitter 11 transmits downlink signals on a downlink data channel and a downlink control channel, for example. Examples of the downlink data channel are a common data channel and a dedicated data channel. In addition, examples of the downlink control channel are a synchronization channel, a broadcast channel, a common control channel, and a dedicated control channel. Examples of the signals to be transmitted are a signal representing system information, a control signal to be transmitted on the dedicated control channel to the wireless terminal 20 in a connected state, and a control signal to be transmitted on the dedicated data channel to the wireless terminal 20 in the connected state. In addition, examples of the signals to be transmitted are a paging signal to be used to call the wireless terminal 20 when a call is received by the wireless terminal 20, a response signal to a signal transmitted from the wireless terminal 20 for channel establishment, a signal representing communication levels of the wireless stations 10A to C, and a control signal for control of uplink transmission power. In addition, the signals to be transmitted include reference signals (also referred to as pilot signals) to be used for channel estimation and demodulation, for example.

The receiver 12 receives a data signal and a control signal from the wireless terminal 20 through the antenna. The receiver 12 receives uplink signals transmitted on an uplink data channel and an uplink control channel, for example. An example of the uplink data channel is a dedicated data channel. In addition, examples of the uplink control channel are a random access channel and a dedicated control channel. Examples of the signals to be received are a signal transmitted from the wireless terminal 20 for channel establishment, a signal representing the level of downlink communication with the wireless terminal 20, and reference signals to be used for channel estimation and demodulation.

The controller 13 transmits and receives data and control information to and from the network device and the other wireless stations 10B and 10C through wired or wireless connections. The controller 13 outputs data to be transmitted and control information to the transmitter 11. In addition, the controller 13 receives received data and control information from the receiver 12. In addition, the controller 13 transmits and receives data and control information through a communication interface and a wired network. In addition, the controller 13 manages access to and from the wireless terminal 20 and schedules the assignment of a wireless source to the wireless terminal 20 and the like.

If the wireless station 10A is a wireless station (hereinafter also referred to as connected wireless station or connected cell) connected to the wireless terminal 20, the controller 13 transmits a signal requesting CoMP communication to the other wireless stations 10B and C (hereinafter also referred to as coordinating wireless stations or coordinating cells), receives response signals from the other wireless stations 10B and C, and prepares CoMP communication, for example.

In addition, the controller 13 selects, from among the plurality of wireless stations 10A to C that are able to execute CoMP communication, one or more wireless stations (hereinafter also referred to as selected wireless stations) that will receive a signal transmitted from the wireless terminal 20, for example. The one or more wireless stations selected from among the plurality of wireless stations is a single wireless station selected by a dynamic point selection (DPS) operation or are two or more wireless stations selected by a joint reception (JR) operation. The DPS is a method for dynamically selecting a point that is among the plurality of points and used for reception. In addition, the JR is a method for executing joint processing (combining) on a signal received by a plurality of points while communicating the signal between the points. For example, the controller 13 acquires information on a communication level between a selected wireless station and the wireless terminal 20 and determines the selected wireless station. Then, a wireless station that actually executes a reception process is switched to the selected wireless station. A process (process of switching to a selected wireless station) of selecting a wireless station is executed at a frequency equal to or lower than a frequency at which a CoMP reception process described later is executed, for example.

In addition, the controller 13 transmits, to the wireless terminal 20, a first control signal related to a communication level between the selected wireless station and the wireless terminal 20. The first control signal is transmitted at a frequency equal to or lower than the frequency at which the process (process of switching to a selected wireless station) of selecting a wireless station is executed, for example.

In addition, the controller 13 acquires information on a communication level between each selected wireless station and the wireless terminal 20 and transmits, as the first control signal, a value representing a characteristic of the communication level between the selected wireless station and the wireless terminal 20, for example. The value that represents the characteristic of the communication level may be, for example, an average value of communication levels between the selected wireless station and the wireless terminal 20 for a predetermined time period. The information on the communication level between each selected wireless station and the wireless terminal 20 is acquired by causing the selected wireless station to receive a reference signal transmitted from the wireless terminal 20, for example. The value that represents the characteristic of the communication level includes a CoMP communication gain, for example. The value that represents the characteristic of the communication level between the selected wireless station and the wireless terminal 20 is acquired based on a reception gain of each selected wireless station with respect to reception by the connected wireless station, for example. The reception gain is acquired based on a ratio or difference between power received by the connected wireless station and the total of power received by the selected wireless station, for example. The value that represents the characteristic of the communication level may be defined for a system bandwidth or for each sub-bandwidth (sub-band).

In addition, the controller 13 transmits, to the wireless terminal 20, a second control signal related to a communication level between the connected wireless station and the wireless terminal 20. The second control signal is, for example, a reference signal transmitted from the connected wireless station. Alternatively, the second control signal may be information that is acquired by causing the connected wireless station to receive a reference signal transmitted from the wireless terminal 20 and is related to the communication level between the connected wireless station and the wireless terminal 20. The transmission of the second control signal is executed at a predetermined control timing or when CoMP communication is prepared, for example.

In addition, the controller 13 executes the CoMP reception process. In the CoMP reception process, uplink data is transmitted from the wireless terminal 20 and received by the selected wireless station, for example. The controller 13 receives, from the selected wireless station, information based on the signal received by the selected wireless station and acquires user data.

In addition, if the wireless station 10A is a coordinating wireless station, the controller 13 receives a signal requesting CoMP communication from the connected wireless station, transmits a response signal, and prepares CoMP communication.

If the wireless station 10A is a selected wireless station, the controller 13 receives a reference signal transmitted from the wireless terminal 20, acquires information on the level of communication with the wireless terminal 20, and notifies the connected wireless station of the acquired information. In addition, the selected wireless station transfers the information based on the received signal to a connected wireless station. Specifically, for example, the selected wireless station may demodulate and decode the received signal and transfer results (user data and success or failure of the decoding) to the connected wireless station. Alternatively, the selected wireless station may transfer the signal received by the selected wireless station and a channel estimation value to the connected wireless station, and the connected wireless station may demodulate and decode the received signal and the channel estimation value.

Figure 3:
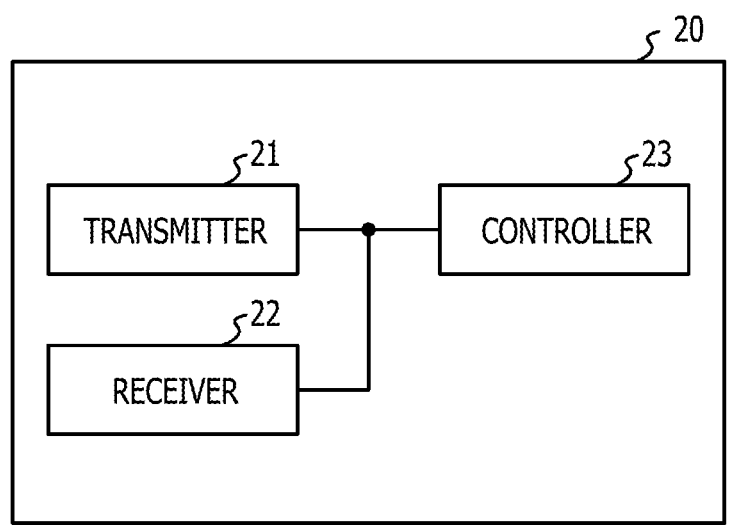
FIG. 3 is a functional block diagram illustrating a configuration of a wireless terminal according to the first embodiment.

FIG. 3 is a functional block diagram illustrating a configuration of the wireless terminal 20. As illustrated in FIG. 3, the wireless terminal 20 includes a transmitter 21, a receiver 22, and a controller 23. These constituent parts are each connected to the other parts uni-directionally or bi-directionally so as to be able to receive and output signals and data from and to the other parts.

The transmitter 21 transmits a data signal and a control signal through an antenna. The antenna may be common to transmission and reception or may be antennas separated for transmission and reception. The transmitter 21 transmits uplink signals on the uplink data channel and the uplink control channel, for example. Examples of the signals to be transmitted are a signal for connection establishment, a signal representing a level received by the wireless terminal 20, and reference signals to be used for channel estimation and demodulation.

The receiver 22 receives data signals transmitted from the wireless stations 10A to C and control signals transmitted from the wireless stations 10A to C through the antenna. Examples of the signals to be received are a signal representing system information, a control signal to be transmitted from the connected wireless station 10A on the dedicated control channel, and a control signal to be transmitted from the connected wireless station 10A on the dedicated data channel. In addition, examples of the signals to be received are a paging signal to be used to call the wireless terminal 20, a response signal to a signal transmitted from the wireless terminal 20 for connection establishment, a signal representing the communication levels of the wireless stations 10A to C, and a control signal for control of uplink transmission power, and reference signals to be used for channel estimation and demodulation.

The controller 23 detects reference signals received from the wireless stations 10A to C and acquires communication levels. The communication levels include received power and received quality, for example. Examples of the communication levels are reference signal received power (RSRP), reference signal received quality (RSRQ) (=a received power value/a total power value), a signal to interference ratio (SIR), and a signal to interference and noise ratio (SINR).

In addition, the controller 23 controls transmission power of a signal to be transmitted. The control of the transmission power is executed by open loop control that compensates for losses (path losses) of transmission from and to the communication points, adaptive modulation control, or closed loop control by a transmission power control (TPC) command, for example. For the open loop control, acquired values (estimated values) of the path losses, the maximum transmission power of the wireless terminal 20, the size of a frequency resource assigned to the wireless terminal 20, a predetermined target value of a received level, and a compensation coefficient are used, for example. In addition, for the adaptive modulation control, an offset value for each modulation and coding scheme (MCS) is used, for example. In addition, for the closed loop control, an offset value set by a TPC command is used, for example.

In this case, the controller 23 receives the first control signal and controls transmission power of a signal to be transmitted to the selected wireless station. Specifically, for example, the controller 23 receives the second control signal, acquires a value related to the transmission power, receives the first control signal, and controls the transmission power. The controller 23 receives the second control signal and acquires a loss of a path to the connected wireless station. The path loss is estimated from the level, acquired from the reference signal, of communication between the wireless terminal 20 and the connected wireless station, for example. In addition, the controller 23 receives the first control signal and acquires a reception gain of the selected wireless station as a value representing a characteristic of a communication level between the selected wireless station and the wireless terminal 20. Then, the controller 23 uses the path loss and the reception gain to control the transmission power. For example, the controller 23 calculates the transmission power using a value obtained by correcting the path loss based on the reception gain.

Figure 4:
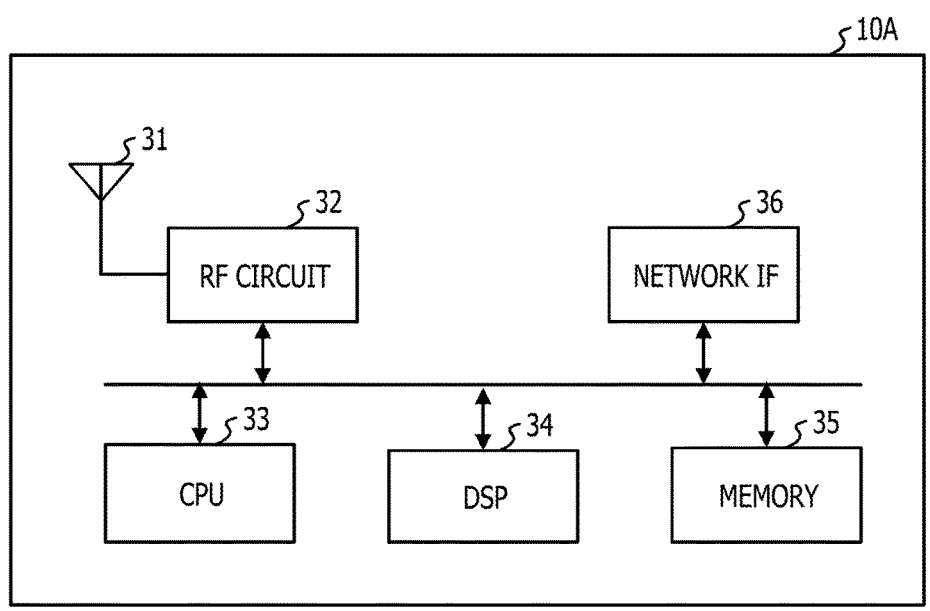
FIG. 4 is a diagram illustrating a hardware configuration of the wireless station according to the first embodiment.

FIG. 4 is a diagram illustrating a hardware configuration of the wireless station 10A. As illustrated in FIG. 4, the wireless station 10A includes, as hardware constituent elements, a radio frequency (RF) circuit 32 provided with the antenna 31, a central processing unit (CPU) 33, a digital signal processor (DSP) 34, a memory 35, a network interface (IF) 36, for example. The CPU is connected so as to be able to receive and output signals of various types and data through the network IF 36 such as a switch. The memory 35 includes at least any of a random access memory (RAM) such as a synchronous dynamic random access memory (SDRAM), a read only memory (ROM), and a flash memory and stores a program, control information, and data, for example. The transmitter 11 and the receiver 12 are achieved by the RF circuit 32 or the antenna 31 and the RF circuit 32, for example. The controller 13 is achieved by an integrated circuit such as the CPU 33 or an integrated circuit such as the DSP 34, for example.

Figure 5:
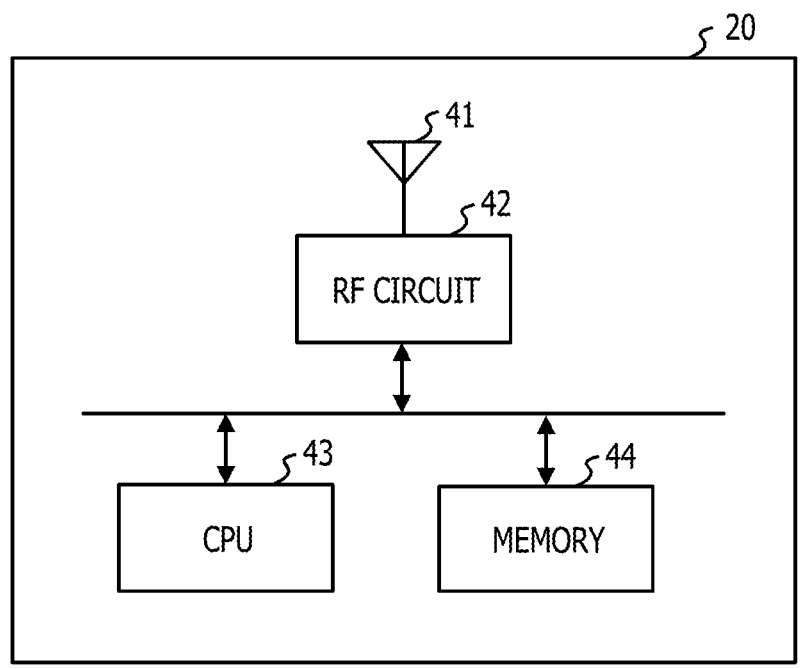
FIG. 5 is a diagram illustrating a hardware configuration of the wireless terminal according to the first embodiment.

FIG. 5 is a diagram illustrating a hardware configuration of the wireless terminal 20. As illustrated in FIG. 5, the wireless terminal 20 includes, as hardware constituent elements, an RF circuit 42 provided with the antenna 41, a CPU 43, and a memory 44, for example. In addition, the wireless terminal 20 may include a display device that is connected to the CPU 43 and is a liquid crystal display (LCD) or the like. The memory 44 includes at least any of a RAM such as a SDRAM, a ROM, and a flash memory and stores a program, control information, and data, for example. The transmitter 21 and the receiver 22 are achieved by the RF circuit 42 or the antenna 41 and the RF circuit 42, for example. The controller 23 is achieved by an integrated circuit such as the CPU 43, for example.

Figure 6:
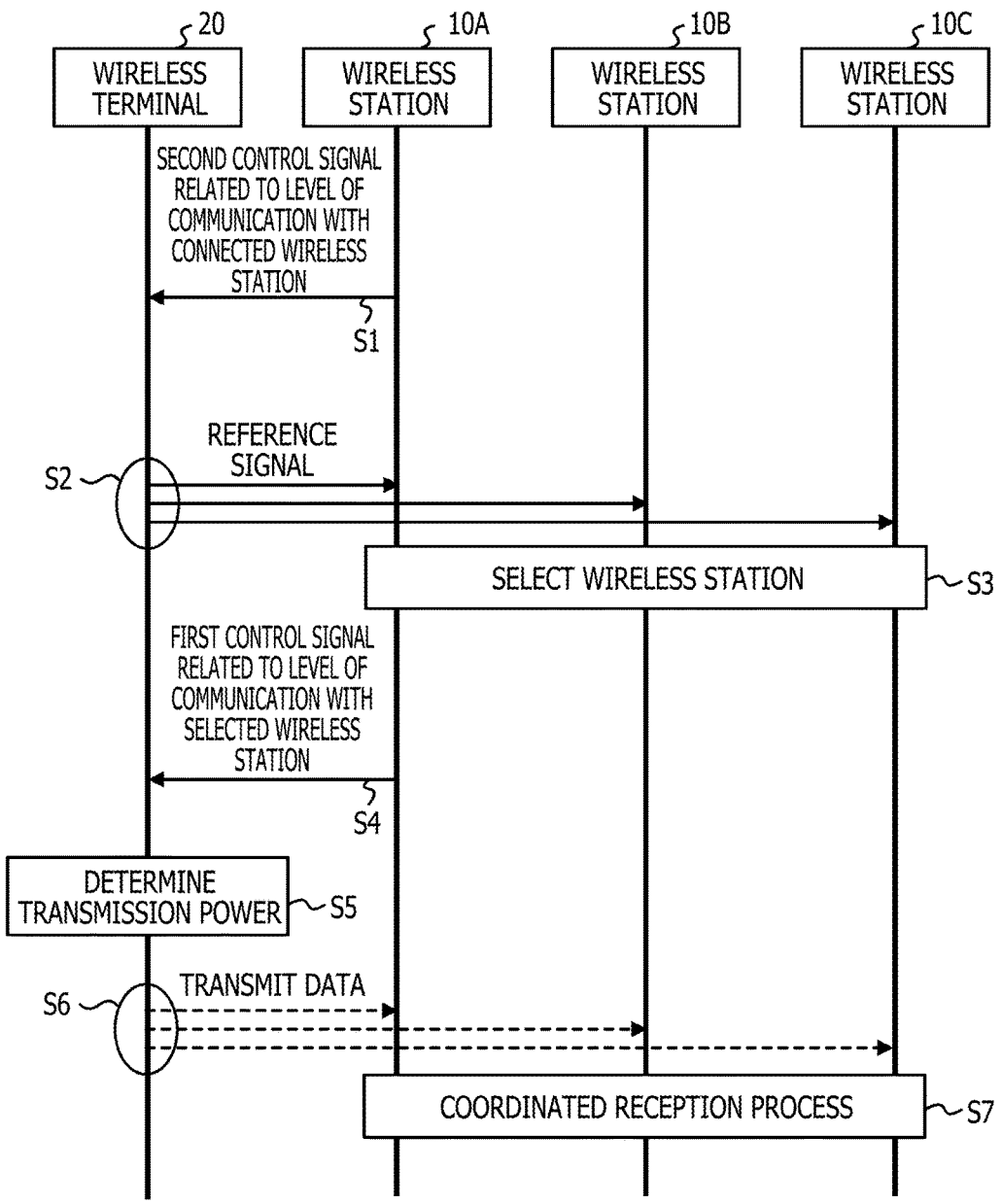
FIG. 6 is a sequence diagram describing operations of the wireless communication system according to the first embodiment.

Next, operations of the wireless communication system 1 according to the first embodiment are described. FIG. 6 is a sequence diagram describing operations of the wireless communication system 1 that are related to CoMP communication.

First, it is premised that, in the wireless communication system 1, the wireless stations 10A to C are installed as the communication points so as to be able to execute CoMP communication, as described above. The wireless station 10A is a wireless station connected to the wireless terminal 20 and executes a process of CoMP communication with the wireless stations 10B and 10C (coordinating wireless stations) in an aggregated manner. Upon transmission of data from the wireless terminal 20, a receiving point that is actually used for coordinated reception of data is selected by the wireless station 10A from among the communication points 10A to C that are able to execute CoMP communication.

In this case, in order to achieve a reduction in inter-point interference and improve the strength of a received signal by CoMP communication, the receiving point to be actually used is dynamically selected at a relatively short time interval. There is a possibility that many communication points that are able to execute CoMP communication exist and the number of receiving points to be actually used and a combination of the receiving points may vary. Thus, the improvement of communication performance may be inhibited depending on the receiving point to be used, unless transmission power of a signal to be transmitted from the wireless terminal 20 is appropriately adjusted.

Specifically, normally, uplink transmission power from the wireless terminal 20 is determined by combining the open loop control based on a path loss estimated using a downlink signal from the connected wireless station with the closed loop control based on the TPC command. However, since the connected wireless station may not be used as the receiving point in CoMP communication, a path loss of the receiving point to be actually used may not be appropriately compensated for based on a path loss related to the connected wireless station, and the transmission power may not be appropriately adjusted.

In the first embodiment, CoMP communication operations are executed as follows.

As illustrated in FIG. 6, the connected wireless station 10A transmits, to the wireless terminal 20, the second control signal related to the communication level between the connected wireless station 10A and the wireless terminal 20 (in S1). The transmission of the second control signal is executed at a predetermined time or when CoMP communication is prepared. The connected wireless station 10A transmits a downlink reference signal as the second control signal, for example. Then, the wireless terminal 20 receives the second control signal, acquires information on the communication level between the connected wireless station and the wireless terminal, and sets a value related to transmission power of a signal to be transmitted from the wireless terminal 20. The wireless terminal 20 calculates, as the value related to the transmission power, a path loss between the wireless terminal 20 and the connected wireless station 10A, for example.

For example, the wireless station 10A may receive an uplink reference signal transmitted from the wireless terminal 20, acquire an uplink communication level, and transmit the uplink communication level as the second control signal to the wireless terminal 20. In this case, for example, the path loss acquired by the connected wireless station 10A may be transmitted as the second control signal, or the communication level may be transmitted as the second control signal and the path loss may be acquired by the wireless terminal 20.

Next, the wireless terminal 20 transmits the uplink reference signal to the wireless stations 10A to C that are able to execute CoMP communication. Control information to be used to transmit the reference signal is notified to the wireless terminal 20 in advance or stored in the wireless terminal 20 in advance, for example. The control information includes a wireless resource to be used to transmit the reference signal and information on a configuration of the reference signal, for example. The wireless stations 10A to C receive the reference signal and acquire communication levels between the wireless terminal 20 and the wireless stations 10A to C. The communication levels include received power, for example.

Next, a coordinated reception process is executed between the wireless stations 10A to C (in S3). Specifically, the connected wireless station 10A selects a wireless station as a receiving point from among the wireless stations 10A to C. For example, the connected wireless station 10A acquires information on the communication levels from the wireless stations 10B and C and selects the wireless station as the receiving point based on the information on the communication levels of the wireless stations 10A to C. Since the selection of the receiving point is executed based on instant communication levels on the side of the wireless station and the network, the selection may be executed at a relatively shorter time interval than handover or the like.

Next, the connected wireless station 10A transmits, to the wireless terminal 20, the first control signal related to a communication level between the selected wireless station and the wireless terminal 20 (in S4). For example, the connected wireless station 10A acquires information on the communication level between the selected wireless station and the wireless terminal 20 and transmits, as the first control signal, a value representing a characteristic of the communication level between the selected wireless station and the wireless terminal 20. The value that represents a characteristic of the communication level between the selected wireless station and the wireless terminal 20 is acquired based on a reception gain of the selected wireless station with respect to reception by the connected wireless station. Then, the wireless terminal 20 receives the first control signal. The transmission of the first control signal may be executed at a frequency lower than the frequency at which the process (process of switching to a selected wireless station) of selecting a wireless station is executed. It is, therefore, possible to suppress an increase in signaling, compared with a case where the first control signal is sequentially notified in coordination with the timing of selecting a receiving point at relatively short time intervals.

Next, the wireless terminal 20 determines the transmission power of the signal to be transmitted to the selected wireless station (in S5). In this case, by receiving the first control signal related to the level of the communication with the selected wireless station and determining the transmission power, it is possible to appropriately set the transmission power so as to compensate for a path loss of the receiving point to be actually used.

Next, the wireless terminal 20 uses the determined transmission power to transmit data to the selected wireless station (in S6).

Next, the coordinated reception process is executed between the wireless stations 10A to C (in S7). Specifically, the wireless station 10A acquires user data from the signal received by the selected wireless station. In this case, since the signal is transmitted with the transmission power appropriately set in S5 in S6, a reduction in inter-point interference and the improvement of the strength of the received signal are achieved and the communication performance of CoMP communication is improved.

In the aforementioned manner, according to the first embodiment, it is possible to appropriately control the transmission power of the signal to be transmitted from the wireless terminal and improve the communication performance in the wireless communication system executing CoMP communication.

Second Embodiment

The wireless communication system according to a second embodiment includes wireless stations 50A to C illustrated in FIG. 7 described later, instead of the wireless stations 10A to C, and includes a wireless terminal 70 illustrated in FIG. 8 described later, instead of the wireless terminal 20. An overall configuration of the wireless communication system according to the second embodiment is the same as or similar to the wireless communication system 1 illustrated in FIG. 1. The wireless stations 50A to C are installed as communication points so as to be able to execute CoMP communication. The following description assumes that the wireless station 50A is a wireless station (connected cell, RP 1) connected to the wireless terminal 70 and that the wireless stations 50B and C are coordinating wireless stations (coordinating cells, RP 2 and 3). The connected wireless station 50A executes a process of CoMP communication, executed by the plurality of wireless stations 50A to C, with the wireless terminal 70 in an aggregated manner. The connected wireless station 50A selects a receiving point (selected wireless station) to be used for the CoMP reception process from among the wireless stations 50A to C.

Figure 7:
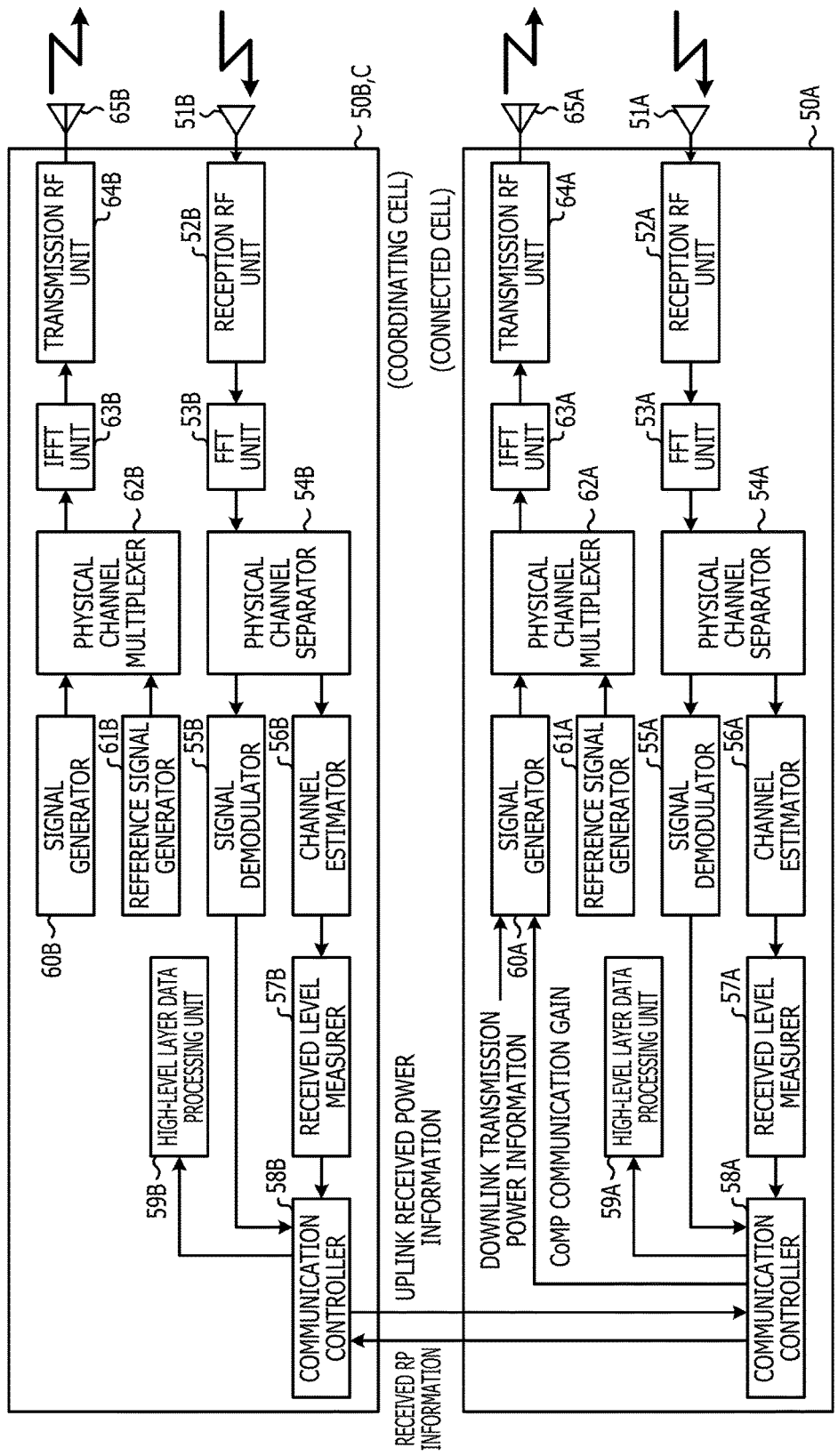
FIG. 7 is a functional block diagram illustrating configurations of wireless stations according to a second embodiment.

FIG. 7 is a functional block diagram illustrating configurations of the wireless stations 50A to C of the wireless communication system according to the second embodiment. As illustrated in FIG. 7, the wireless station 50A includes a reception antenna 51A, a reception RF unit 52A, a fast Fourier transform (FFT) unit 53A, a physical channel separator 54A, a signal demodulator 55A, a channel estimator 56A, a received level measurer 57A, a communication controller 58A, a high-level layer data processing unit 59A, a signal generator 60A, a reference signal generator 61A, a physical channel multiplexer 62A, an inverse fast Fourier transform (IFFT) unit 63A, a transmission RF unit 64A, and a transmission antenna 65A.

In addition, the wireless station 50B includes a reception antenna 51B, a reception RF unit 52B, an FFT unit 53B, a physical channel separator 54B, a signal demodulator 55B, a channel estimator 56B, a received level measurer 57B, a communication controller 58B, a high-level layer data processing unit 59B, a signal generator 60B, a reference signal generator 61B, a physical channel multiplexer 62B, an IFFT unit 63B, a transmission RF unit 64B, and a transmission antenna 65B. A functional configuration and hardware configuration of the wireless station 50C are the same as or similar to the wireless station 50B.

The reception antenna 51A receives a wireless signal and outputs the wireless signal to the reception RF unit 52A. The wireless station 50A may include a plurality of reception antennas. In addition, the reception antenna 51A may be shared with the transmission antenna 65A and configured so as to switch between transmission and reception by a transmission/reception switch unit or the like. The reception antenna 51A receives uplink signals (data signal and control signal) transmitted on the uplink data channel and the uplink control channel, for example. Examples of the physical channels from which the signals are received are a physical random access channel (PRACH), a physical uplink shared channel (PUSCH), and a physical uplink control channel (PUCCH). The signals to be received include a random access channel (RACH) signal for connection establishment, a signal (for example, RSRP report) representing a level received by the wireless terminal 70, and reference signals for channel estimation and demodulation, for example.

The reception RF unit 52A executes a process such as analog-to-digital (A/D) conversion on the received signal. The FFT unit 53A executes an FFT process on the digital signal. The physical channel separator 54A separates signals of channels from the signal subjected to the FFT process. The signal demodulator 55A executes a process of demodulating the separated signals of the channels based on control information notified or stored in advance and the reference signal for the demodulation. The channel estimator 56A acquires a channel estimation value representing transmission states of the channels based on the control information notified or stored in advance and the received reference signal. The demodulated signals are decoded based on the channel estimation value. The data signal and the control signal that are decoded and acquired are output to the communication controller 58A. In addition, as a result of decoding the data signal, an acknowledgement (ACK)/negative acknowledgement (NACK) is output to the communication controller 58A.

The received level measurer 57A measures a received level (uplink received power and uplink received quality) from the received reference signal. Examples of the received level are an SIR and an SINR.

The communication controller 58A transmits and receives data and control information to and from the network device and the other wireless stations through wired or wireless connections. In addition, the communication controller 58A manages access to and from the wireless terminal 70, schedules the assignment of a wireless resource to the wireless terminal 70 and the like, and controls transmission power.

In addition, the communication controller 58A outputs, to the signal generator 60A, a parameter to be treated as downlink transmission power information and used to estimate a loss of a downlink path by the wireless terminal 70, and transmits the parameter to the wireless terminal 70 in a connected state. In addition, the communication controller 58A executes a process related to CoMP communication. The process related to CoMP communication is described later.

The high-level layer data processing unit 59A executes a reordering process on the decoded data signal or the like and acquires uplink user data. In addition, the high-level layer data processing unit 59A processes downlink user data acquired from the network device and the other wireless stations and control information to be transmitted and generates a transmission packet.

The signal generator 60A encodes and modulates the transmission packet and outputs the transmission packet to the physical channel multiplexer 62A. In addition, the signal generator 60A generates a control signal to be transmitted on a dedicated control channel and outputs the control signal to the physical channel multiplexer 62A. The reference signal generator 61A generates a downlink reference signal and outputs the downlink reference signal to the physical channel multiplexer 62A.

The physical channel multiplexer 62A assigns the encoded and modulated transmission packet, the control signal, and the reference signal to a wireless resource of a physical channel. The IFFT unit 63A executes an IFFT process on a signal after multiplexing. The transmission RF unit 64A executes D/A conversion, a distortion compensation process, an amplification process, and the like on the signal after the IFFT process and outputs the signal to the transmission antenna 65A.

The transmission antenna 65A transmits the wireless signal received from the transmission RF unit 64A. The wireless station 50A may include a plurality of transmission antennas. The transmission antenna 65A transmits downlink signals (data signal and control signal) on the downlink data channel and the downlink control channel, for example. Examples of the physical channels on which the signals are transmitted are a physical broadcast channel (PBCH), a physical multicast channel (PMCH), a physical downlink shared channel (PDSCH), and a dedicated control channel (physical downlink control channel (PDCCH)). Examples of the signals to be transmitted are a paging channel (PCH) signal to be used to call the wireless terminal 70 when a call is received by the wireless terminal 70 and a response signal to a RACH signal. In addition, examples of the signals to be transmitted are a signal representing a level received by the wireless station 50A, reference signals to be used for channel estimation and demodulation, and a control signal (for example, downlink transmission power information, a TPC command, or the like) for control of uplink transmission power. Examples of the control signal are L1/L2 signaling to be transmitted on the dedicated control channel to the wireless terminal 70 in the connected state and RRC (radio resource control) signaling to be transmitted on the shared channel to the wireless terminal 70 in the connected state. In addition, an example of the control signal is system information stored in a master information block (MIB) or a system information block (SIB) and to be transmitted on the broadcast channel or the shared channel specified by the broadcast channel.

Basic functions, other than CoMP communication, of the configurations 51B to 65B of the coordinating wireless station 50B are the same as or similar to the functions of the configurations 51A to 65A of the connected wireless station 50A.

Next, the process related to CoMP communication is described. In the second embodiment, a DPS operation of dynamically selecting a point to be used for reception from among the plurality of points is used in the CoMP reception. The connected wireless station 50A selects one of the wireless stations 50A to C as a receiving point.

In the connected wireless station 50A, the communication controller 58A executes a process of transmitting and receiving information on the receiving point (RP) for receiving an uplink data signal from the wireless terminal 70 to and from the communication controllers of the coordinating wireless stations and selected wireless station, a process of transmitting and receiving user data transmitted from the wireless terminal 70 to and from the communication controller of the selected wireless station, a process of transferring user data transmitted from the wireless terminal 70 to the high-level layer data processing unit 59A, and the like.

The communication controller 58A transmits a signal requesting CoMP communication to the wireless stations 50B and C able to execute CoMP communication, receives response signals from the wireless stations 50B and C, and prepares CoMP communication.

When CoMP communication is prepared, the communication controller 58A receives information (for example, uplink received power information measured in response to an uplink reference signal from the wireless terminal 70) on received levels acquired by the wireless stations 50B and C. The communication controller 58A selects an RP to be actually used for the process of receiving a signal from the wireless terminal 70, from among the wireless stations 50A to C based on the information on the received levels of the wireless stations 50A to C. Then, the communication controller 58A notifies the selected wireless station of the received RP information.

In addition, the communication controller 58A outputs, to the signal generator 60A, a value (for example, a CoMP communication gain) representing a characteristic of a communication level between the selected wireless station and the wireless terminal 70 based on the information on the received levels of the wireless stations 50A to C and transmits the value to the wireless terminal 70. For example, as the received levels of the wireless stations 50A to C (RP), instant received power of the signal (uplink reference signal) transmitted from the wireless terminal 70 in each RP is used. In this case, in the DPS operation, instant CoMP communication gains Gain_CoMP (dB) (of time slots) may be expressed using received power Power_s (dBm) of the selected RP and received power Power_0 (dBm) of the connected cell according to the following Equation (1).

$$Gain\_CoMP = Power\_s - Power\_0 \quad (1)$$

In addition, the communication controller 58A treats, as a CoMP communication gain, an average value of instant CoMP communication gains Gain_CoMP for a predetermined time period. Then, the communication controller 58A transmits the CoMP communication gain to the wireless terminal 70. The CoMP communication gain is transmitted at a frequency lower than a frequency at which the process of selecting an RP is executed. The communication controller 58A may use an intermediate value, the maximum value, or the minimum value, instead of the average value. Alternatively, the communication controller 58A may thin out the instant CoMP communication gains Gain_CoMP and transmit the CoMP communication gain at a frequency lower than the frequency at which the process of selecting an RP is executed. In addition, the CoMP communication gain may be defined for a system bandwidth or may be defined for each sub-bandwidth (sub-band). If the CoMP communication gain is defined for each sub-band, a variation in the frequency of the CoMP communication gain may be reflected, for example.

In addition, the communication controller 58A acquires user data from a signal received from the selected wireless station and outputs the user data to the high-level layer data processing unit 59A.

In the coordinating wireless station 50B, the communication controller 58B receives the signal requesting CoMP communication from the communication controller 58A, notifies the communication controller 58A of a response signal, and prepares CoMP communication.

When CoMP communication is prepared, the communication controller 58B notifies the communication controller 58A of information (for example, uplink received power information measured by the received level measurer 57B in response to a reference signal from the wireless terminal 70) on the level received by the wireless station 50B.

In addition, if the communication controller 58B is selected as an RP, the communication controller 58B, as a selected wireless station, receives a notification of received RP information from the connected wireless station 50A. Then, the communication controller 58B executes a process of receiving an uplink transmission signal from the wireless terminal 70 and notifies the communication controller 58A of information on the received signal. For example, the communication controller 58B demodulates and decodes the received signal and transfers results (user data and success or failure of the decoding) to the communication controller 58A, for example. In addition, for example, the communication controller 58B may transfer the reception signal and a channel estimation value to the connected wireless station.

Figure 8:
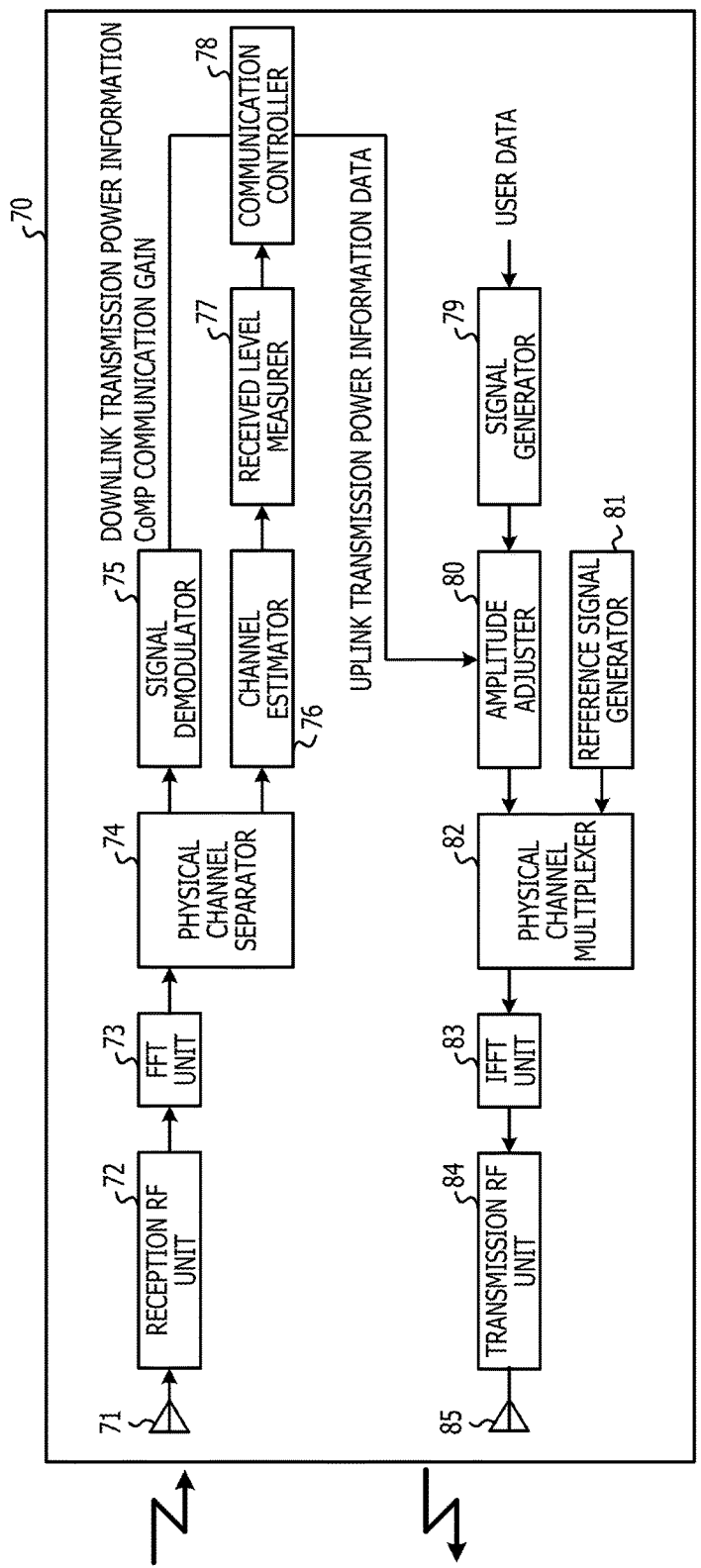
FIG. 8 is a functional block diagram illustrating a configuration of a wireless terminal according to the second embodiment.

FIG. 8 is a functional block diagram illustrating a configuration of the wireless terminal 70 according to the second embodiment. As illustrated in FIG. 8, the wireless terminal 70 includes a reception antenna 71, a reception RF unit 72, an FFT unit 73, a physical channel separator 74, a signal demodulator 75, a channel estimator 76, a received level measurer 77, a communication controller 78, a signal generator 79, an amplitude adjuster 80, a reference signal generator 81, a physical channel multiplexer 82, an IFFT unit 83, a transmission RF unit 84, and a transmission antenna 85.

The reception antenna 71 receives a wireless signal and outputs the wireless signal to the reception RF unit 72. The wireless terminal 70 may include a plurality of reception antennas. In addition, the reception antenna 71 may be shared with the transmission antenna 85 and configured so as to switch between transmission and reception by a transmission/reception switch unit or the like. The reception antenna 71 receives uplink signals (data signal and control signal) transmitted on the uplink data channel and the uplink control channel, for example. Examples of the signals to be received are a PCH signal to be used to call the wireless terminal 70 when a call is received by the wireless terminal 70 and a response signal to a RACH signal from the wireless terminal 70. In addition, examples of the signals to be received are a signal representing a level received by the wireless station 50A, reference signals to be used for channel estimation and demodulation, and a control signal (for example, downlink transmission power information, a TPC command, or the like) for control of uplink transmission power. Examples of the control signal are L1/L2 signaling to be transmitted from the connected wireless station 50A on the dedicated control channel and RRC signaling to be transmitted from the connected wireless station 50A on the shared channel. In addition, an example of the control signal is system information stored in an MIB or an SIB and to be transmitted on the broadcast channel or the shared channel specified by the broadcast channel.

The reception RF unit 72 executes a process such as A/D conversion on the received signal. The FFT unit 73 executes an FFT process on the digital signal. The physical channel separator 74 separates signals of channels from the signal subjected to the FFT process. The physical channel separator 74 acquires a subcarrier signal from a received orthogonal frequency division multiplexing (OFDM) signal, for example. The signal demodulator 75 executes a process of demodulating the separated signals of the channels based on control information notified or stored in advance and a reference signal for demodulation. The channel estimator 76 acquires a channel estimation value representing transmission states of the channels based on the control information notified or stored in advance and the received reference signal. The demodulated signals are decoded based on the channel estimation value. User data acquired by the decoding process and the control information are output to the communication controller 78. Examples of the control information are information of downlink transmission power and information on the CoMP communication gain. In addition, as a result of decoding the data signal, an ACK/NACK is output to the communication controller 78.

The received level measurer 77 measures a received level (downlink received power and downlink received quality) from the received reference signal. Examples of the received level are an RSRP, an RSRQ, an SIR, and an SINR.

The communication controller 78 calculates uplink transmission power and outputs information of the uplink transmission power to the amplitude adjuster 80. Specifically, the communication controller 78 calculates transmission power $P_{PUSCH,\,c}(i)$ (dBm) of the uplink shared channel (PUSCH) in a subframe i according to the following Equation (2).

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \\ \alpha_c(j) \cdot (PL_c - Gain_{DPS}) + \Delta_{TF,c}(i) + f_c(i) \end{Bmatrix} \quad (2)$$

In this case, $P_{MAX,\,c}(i)$ is the maximum transmission power, $M_{PUSCH,\,c}(i)$ is the size of an assigned frequency resource block (RB), $P_{O\_PUSCH,\,c}(j)$ is, for example, a target value of received power in a mode (j=1) for dynamic scheduling, $PL_c$ is a path loss (transmission loss) estimated using a downlink signal, and α is a path loss coefficient (representing a degree of compensation for the path loss). In addition, $D_{TF,\,c}(i)$ is an offset value for each modulation and coding scheme (MCS), and $f_c(i)$ is an offset value set by closed loop control using a TPC command. In addition, the parameter $P_{O\_PUSCH,\,c}(J)$ and α that are related to the open loop control for compensating for the path loss are stored in the wireless terminal 70 in advance or notified by the wireless station 50A.

The signal generator 79 generates a transmission packet from uplink user data and control information. The generated transmission packet is encoded and modulated, adjusted in amplitude based on the information of the uplink transmission power, and output to the physical channel multiplexer 82. The reference signal generator 81 generates an uplink reference signal and outputs the uplink reference signal to the physical channel multiplexer 82.

The physical channel multiplexer 82 assigns the encoded and modulated transmission packet and the reference signal to a wireless resource of a physical channel. The IFFT unit 83 executes an IFFT process on a signal after multiplexing. The transmission RF unit 84 executes D/A conversion, a distortion compensation process, an amplification process, and the like on the signal after the IFFT process and outputs the signal to the transmission antenna 85.

The transmission antenna 85 transmits the wireless signal received from the transmission RF unit 84. The wireless terminal 70 may include a plurality of transmission antennas. The transmission antenna 85 transmits uplink signals (data signal and control signal) on the uplink data channel and the uplink control channel. The signals to be transmitted include an RACH signal for channel establishment, a signal representing a level received by the wireless terminal 70, and reference signals for channel estimation and demodulation, for example.

Hardware configurations of the wireless stations 50A and B of the wireless communication system according to the second embodiment are the same as or similar to the hardware configuration of the wireless station 10A illustrated in FIG. 4. The reception antennas 51A and B, reception RF units 52A and B, transmission RF units 64A and B, and transmission antennas 65A and B of the wireless stations 50A and B are achieved by antennas and RF circuits, for example. In addition, the FFT units 53A and B, physical channel separators 54A and B, signal demodulators 55A and B, channel estimators 56A and B, received level measurers 57A and B, communication controllers 58A and B, high-level layer data processing units 59A and B, signal generators 60A and B, reference signal generators 61A and B, physical channel multiplexers 62A and B, and IFFT units 63A and B of the wireless stations 50A and B are achieved by integrated circuits such as DSPs or integrated circuits such as CPUs, for example.

In addition, a hardware configuration of the wireless terminal 70 of the wireless communication system according to the second embodiment is the same as or similar to the hardware configuration of the mobile terminal 40 illustrated in FIG. 5. The reception antenna 71, reception RF unit 72, transmission RF unit 84, and transmission antenna 85 of the wireless terminal 70 are achieved by antennas and RF circuits, for example. The FFT unit 73, physical channel separator 74, signal demodulator 75, channel estimator 76, received level measurer 77, communication controller 78, signal generator 79, amplitude adjuster 80, reference signal generator 81, physical channel multiplexer 82, and IFFT unit 83 of the wireless terminal 70 are achieved by integrated circuits such as CPUs, for example.

Next, operations of the wireless communication system according to the second embodiment are described with reference to FIGS. 9 to 11.

Figure 9:
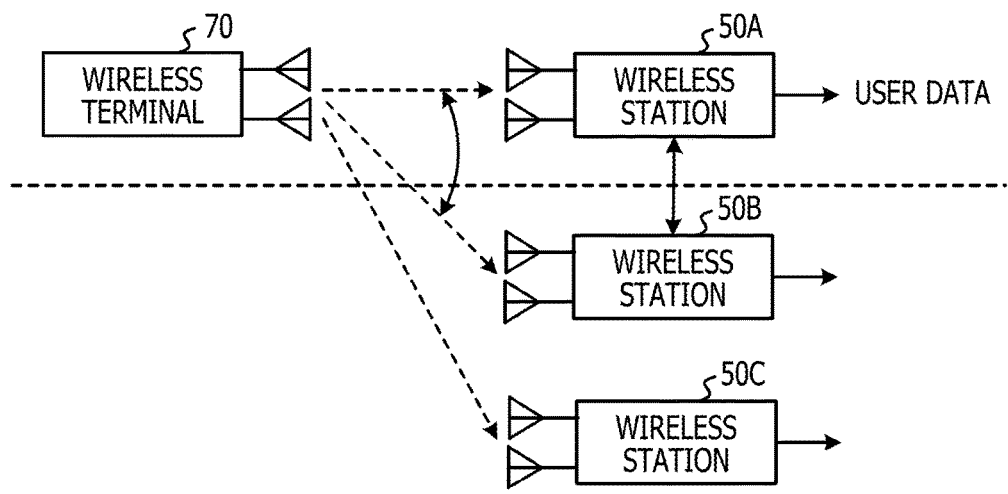
FIG. 9 is a diagram describing a DPS operation of the wireless communication system according to the second embodiment.

An example of the operations of the wireless communication system according to the second embodiment is illustrated in FIG. 9. First, it is premised that, in the wireless communication system according to the second embodiment, the wireless stations 50A to C are installed as the communication points so as to be able to execute CoMP communication, as described above. The wireless station 50A is a wireless station connected to the wireless terminal 70 and executes the process of CoMP communication with the wireless stations 50B and 50C (coordinating wireless stations) in the aggregated manner. Then, upon transmission of data from the wireless terminal 70, a receiving point to be actually used for coordinated reception of data is selected by the wireless station 50A from among the communication points 50A to C that are able to execute the CoMP communication process. In the example illustrated in FIG. 9, the wireless station 50B is selected as a selected wireless station for actually executing the reception process, from among the wireless stations 50A to C. Then, user data acquired from a signal received by the wireless station 50B is transferred to the wireless station 50A and acquired as user data from the wireless terminal 70.

FIG. 10 is a sequence diagram illustrating operations of the wireless communication system according to the second embodiment. As illustrated in FIG. 10, the connected wireless station 50A transmits a downlink reference signal to the wireless terminal 70 (in S21). The downlink reference signal is an example of the second control signal related to a communication level between the connected wireless station 50A and the wireless terminal 70. Next, the wireless terminal 70 receives the downlink reference signal and calculates a path loss between the wireless terminal 70 and the wireless station 50A (in S22). Specifically, for example, the wireless terminal 70 measures downlink received power from the downlink reference signal and acquires an estimated value of the path loss based on the difference between downlink transmission power and the downlink received power. Control information to be used to receive the downlink reference signal is notified to the wireless terminal 70 in advance or stored in the wireless terminal 70 in advance. In addition, information on the downlink transmission power is notified to the wireless terminal 70 in advance or stored in the wireless terminal 70 in advance. The process of calculating the path loss in S21 and S22 is executed at the predetermined control timing or when CoMP communication is prepared.

Next, the wireless terminal 70 transmits an uplink reference signal (in S23). Control information to be used to transmit the uplink reference signal is notified to the wireless terminal 70 in advance or stored in the wireless terminal 70 in advance. Then, the wireless stations 50A to C that are able to execute CoMP communication receive the uplink reference signal from the wireless terminal 70. Control information to be used to receive the uplink reference signal by the wireless stations 50A to C are notified to the wireless stations 50A to C in advance or stored in the wireless stations 50A to C in advance.

Next, the wireless stations 50A to C receive the uplink reference signal and measure received power (in S24 to S26). Next, the coordinating wireless stations 50B and C notify the wireless station 50A of the measured received power (in S27 and S28). Next, the connected wireless station 50A selects a receiving point (RP) based on the received power of the wireless stations 50A to C (in S29). As the RP, a wireless station of which received power is largest among the wireless stations 50A to C is selected. Since the selection of the RP is executed based on instant communication levels on the side of the wireless station and the network, the selection of the RP may be executed at a relatively shorter time interval than handover or the like, for example. The RP may not be an overall RP set able to execute CoMP and may be selected from among a candidate RP set among the RP set able to execute CoMP.

Next, the connected wireless station 50A transmits received RP information to the selected RP (in S30). For example, if the coordinated wireless station 50B (RP 2) is selected as illustrated in FIG. 10, the received RP information is transmitted from the connected wireless station 50A to the coordinating wireless station 50B. This switches to the RP.

Next, the connected wireless station 50A updates the CoMP communication gain (DPS gain) in the DPS operation (in S31). Specifically, for example, the connected wireless station 50A calculates differences between the received power of the selected RP and the received power of the connected cell and treats, as a new DPS gain, an average value of the calculated values for a predetermined time period before the selection timing. The RP switching process of S23 to S31 is executed periodically or non-periodically. In this case, the RP switching process is executed at a frequency F1 equal to or lower than a frequency at which the CoMP reception process of S33 to S36 described later is executed, for example.

Next, the connected wireless station 50A transmits the DPS gain to the wireless terminal 70 (in S32). The DPS gain is an example of the first control signal related to communication levels between the selected wireless stations 50A and B and the wireless terminal 70. The gain transmission process of S32 is executed periodically or non-periodically, for example. In this case, the gain transmission process is executed at a frequency F2 lower than the frequency F1 at which the RP switching process is executed, for example. Specifically, the gain transmission process of S32 is not executed for each time of the RP switching process and is skipped until the next execution timing. Thus, an increase in signaling may be suppressed, compared with a case where the DPS gain is sequentially notified in coordination with the timing of selecting an RP at relatively short intervals. The DPS gain is transmitted on the PDCCH and the PDSCH, for example. The DPS gain may be stored in an existing downlink control information (DCI) format and transmitted, for example. A region for storing the DPS gain may be a fixed region included in the format, or the size of the format may be variable and the region may be secured only when the DPS gain is to be transmitted. Alternatively, signaling for transmission control (or for transmission of the DPS gain) and a format may be defined and the DPS gain may be transmitted separately from the DCI, for example.

Next, in S33 to S36, the CoMP reception process is executed. Specifically, the wireless terminal 70 calculates transmission power of an uplink data signal. The uplink transmission power is calculated using the path loss calculated in S22 and the DPS gain received in S32 according to the aforementioned Equation (2). In this manner, by receiving a value representing a characteristic of a communication level between the selected RP and the wireless terminal 70 and determining the transmission power, the transmission power may be appropriately set so as to ensure that the path loss of the RP to be actually used for the reception process is compensated for.

Next, the wireless terminal 70 transmits the uplink data signal using the transmission power calculated in S33 (in S34). Then, the selected wireless station 50B receives the uplink data signal from the wireless terminal 70. Next, the selected wireless station 50B decodes the data signal, acquires user data (in S35), and transfers results (user data and ACK/NACK) of the decoding to the connected wireless station 50A (in S36). The connected wireless station 50A acquires the user data transferred from the selected wireless station 50B as user data from the wireless terminal 70. In addition, the connected wireless station 50A may execute retransmission control by the transferred ACK/NACK. In this case, since the uplink data signal is transmitted with the transmission power appropriately set in S33 in S34, a reduction in inter-point interference and the improvement of the strength of the received signal are achieved and the communication performance of CoMP communication is improved. The CoMP reception process of S33 to S36 is repeated periodically or non-periodically until at least any of the path loss calculation process of S21 and S22, the RP switching process of S23 to S31, and the gain transmission process of S32 is next executed.

Figure 11A:
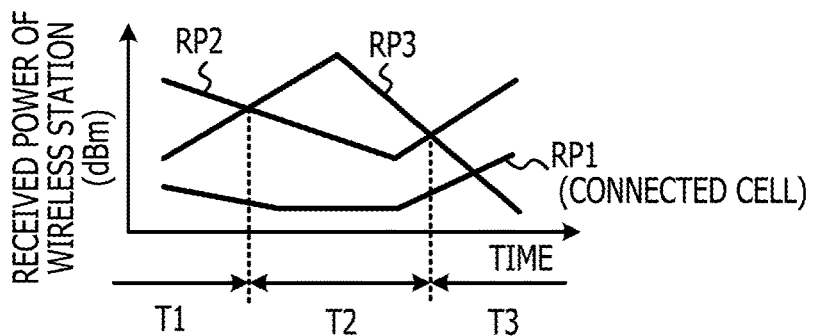
FIG. 11A is a graph describing operation of the wireless communication system according to the second embodiment.
Figure 11B:
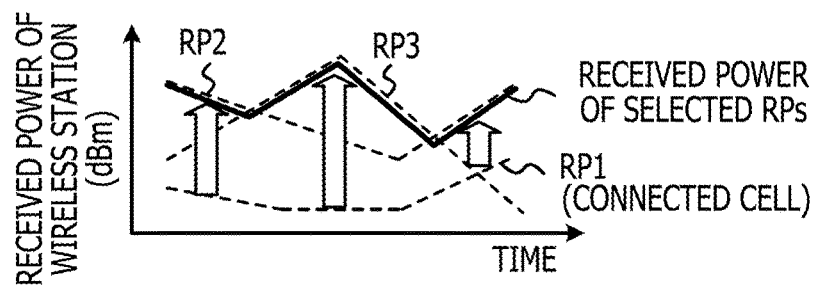
FIG. 11B is a graph describing operation of the wireless communication system according to the second embodiment.

Hereinafter, the aforementioned operations of the wireless communication system according to the second embodiment are described with reference to FIGS. 11A to C. Graphs of FIGS. 11A and B are graphs schematically illustrating power received by the wireless stations. In the graphs of FIGS. 11A and B, the abscissae represent time, and the ordinates represent the received power (dBm). The power received by the RPs 1 to 3 is represented by three solid lines in the graph of FIG. 11A. For example, if a wireless station of which received power is maximal is selected as an RP that actually executes the reception process, from among the wireless stations 50A to C, the RP 2 is selected when the RP selection process is executed in a time period T1, the RP 3 is selected when the RP selection process is executed in a time period T2, and the RP 2 is selected when the RP selection process is executed in a time period T3. The received power of the selected RPs is represented by a solid line in the graph of FIG. 11B. The power received by the RPs 1 to 3 and illustrated in FIG. 11A is represented by three broken lines in the graph of FIG. 11B. In this case, differences between the received power of the selected RPs and the received power of the connected cell are acquired, as indicated by three white arrows in a vertical direction of the graph of FIG. 11B.

Figure 11C:
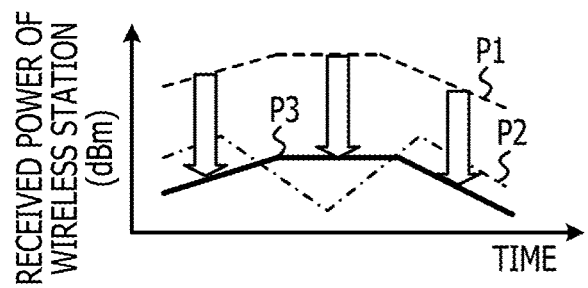
FIG. 11C is a graph describing operation of the wireless communication system according to the second embodiment.

FIG. 11C is a graph schematically illustrating transmission power of the wireless terminal. In the graph of FIG. 11C, the abscissa represent time, and the ordinate represents transmission power (dBm). In the graph of FIG. 11C, a broken line represents transmission power P1 of the wireless terminal 70 that is calculated in consideration of the received power (path loss of the RP 1) of the connected cell RP 1, and an alternate long and short dash line represents transmission power P2 of the wireless terminal 70 that is calculated in consideration of the received power (path losses of the selected RPs) of the selected RPs. Since the received power of the connected cell is lower than the received power of the selected RPs, the transmission power P1 is higher than the transmission power P2, as illustrated in FIG. 11C. Specifically, the transmission power of the wireless terminal 70 is excessive. On the other hand, a solid line of the graph of FIG. 11C represents transmission power P3 of the wireless terminal 70 that is calculated based on the received power (path loss of the RP 1) of the connected cell RP 1 and the DPS gain (average value of differences between the received power of the selected RPs and the received power of the connected cell for a predetermined time period). According to the transmission power P3, since characteristics of communication levels between the selected wireless stations to be actually used for the reception process and the wireless terminal 70 are reflected in the transmission power P3 and the transmission power P3 is determined, a state in which the transmission power is excessive is reduced, compared with the transmission power P1 calculated in consideration of the received power of the connected cell RP 1. In addition, according to the transmission power P3, an increase in signaling may be reduced, compared with the transmission power P2 calculated by notifying the wireless terminal 70 of the DPS gain for each time of the RP switching process, for example. Thus, even if a RP is frequently switched, control of the transmission power of the wireless terminal 70 based on the transmission power in which a characteristic of a communication level between a selected wireless station and the wireless terminal 70 is reflected may be achieved, inter-cell interference may be reduced, and throughput may be improved.

According to the second embodiment, in the wireless communication system that executes CoMP communication, transmission power of a signal to be transmitted from the wireless terminal may be appropriately controlled and the communication performance may be improved.

Third Embodiment

Figure 12:
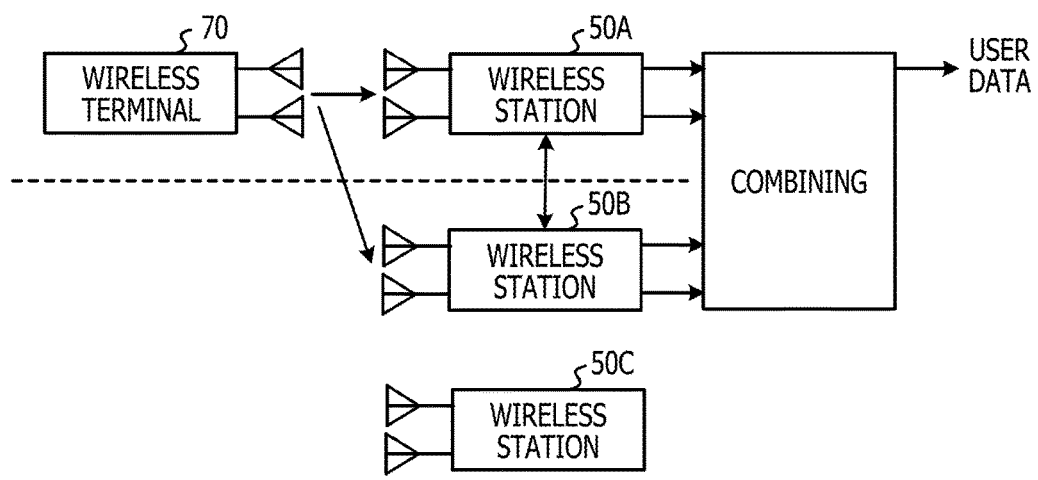
FIG. 12 is a diagram describing a JR operation of the wireless communication system according to a third embodiment.
Figure 13:
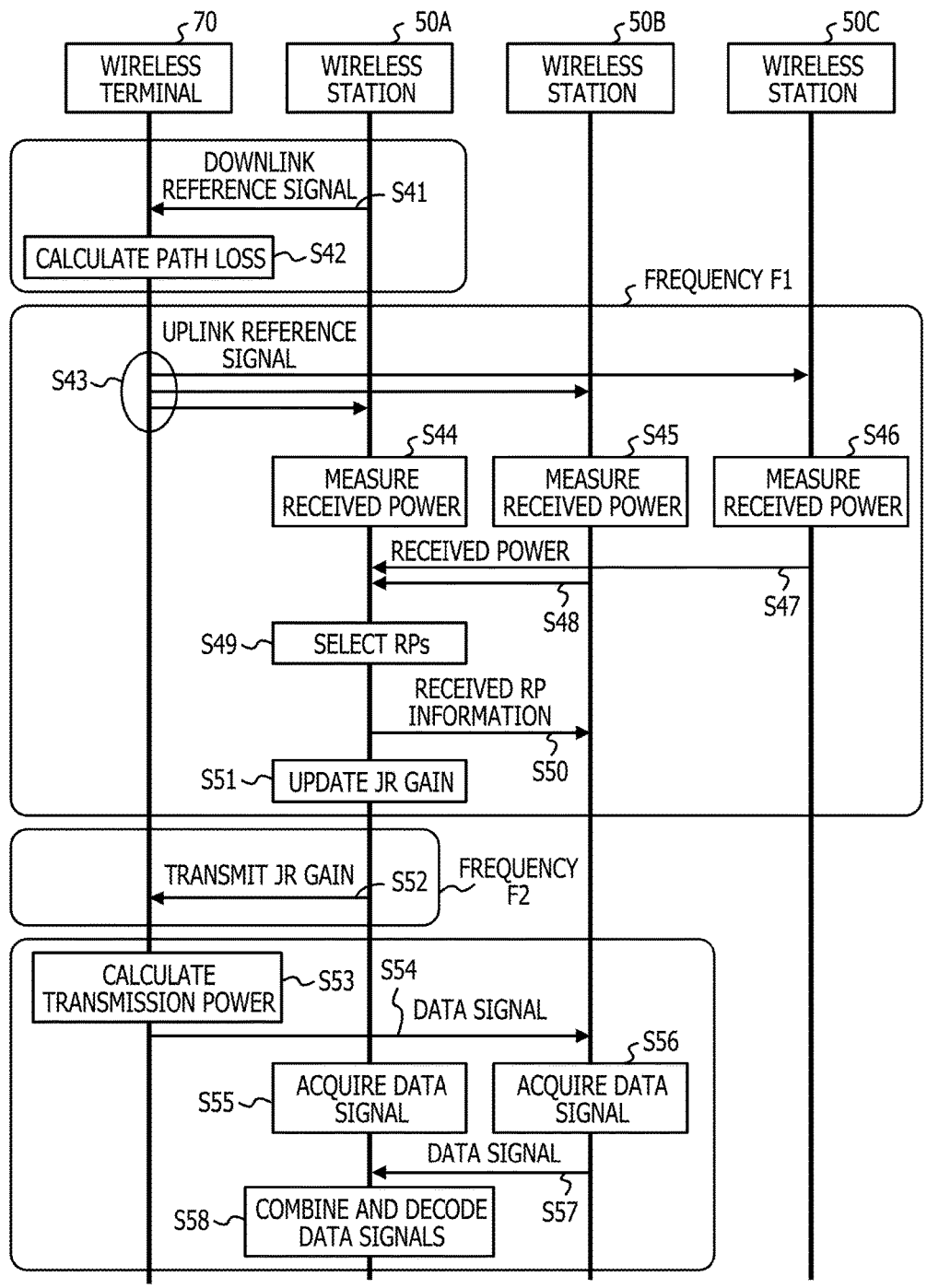
FIG. 13 is a sequence diagram describing operations of the communication system according to the third embodiment.

Next, the wireless communication system according to a third embodiment is described with reference to FIGS. 12 and 13. FIG. 12 is a diagram describing an example of the JR operation of the wireless communication system, while FIG. 13 is a sequence diagram describing operations related to CoMP communication of the wireless communication system according to the third embodiment. An overall configuration of the wireless communication system according to the third embodiment is the same as or similar to the wireless communication system according to the second embodiment.

In the third embodiment, the JR operation of executing the joint processing (combining) on a signal received by the plurality of points while communicating the signal between the points is used in the CoMP reception. The connected wireless station 50A selects two or more wireless stations as receiving points from among the wireless stations 50A to C.

In the third embodiment, the communication controller 58A selects RPs (an RP serving as a connected cell and a coordinating RP that coordinates with the connected cell) to be actually used for the process of receiving a signal from the wireless terminal 70, from among the wireless stations 50A to C based on information related to received levels of the wireless stations 50A to C. Then, the communication controller 58A notifies the selected wireless stations of received RP information. As the coordinating RP, an RP from which an effect of the CoMP reception may be expected is selected. For the selection (switching) of the RPs, uplink received levels of the RPs that are measured by the wireless stations 50A to C and downlink received levels of the RPs that are fed back from the wireless terminal 70 may be used. Examples of the received levels are RSRPs, RSRQ, SIRs, and SINRs. In addition, an example of the selection of the RPs is a method for using the downlink received levels of the RPs that are fed back from the wireless terminal as criteria for determination and selecting RPs of which received levels are different by a predetermined threshold or smaller from the received level of the RP of the connected cell. In addition, an example of the selection of the RPs is a method for using path losses estimated based on the downlink received levels of the RPs.

In addition, the communication controller 58A outputs, to the signal generator 60A, a value (for example, a CoMP communication gain) representing characteristics of communication levels between the selected wireless stations and the wireless terminal 70, based on information related to the received levels of the wireless stations 50A to C, and transmits the value to the wireless terminal 70. In this case, in the JR operation, instant CoMP communication gains Gain_CoMP (dB) (of time slots) may be calculated based on ratios or differences between the received levels when the JR operation is applied and the received levels when single-point reception is applied, for example. Specifically, for example, the instant CoMP communication gains Gain_CoMP may be calculated based on a ratio or difference between the total of the received power of the RPs (RP of the connected cell and the coordinating RPs) that execute the coordinated reception and the received power of the RP of the connected cell. In addition, the communication controller 58A treats, as the CoMP communication gain, an average value of the instant CoMP communication gains Gain_CoMP for the predetermined time period. Then, the communication controller 58A transmits the CoMP communication gain to the wireless terminal 70. The CoMP communication gain is transmitted at a frequency lower than a frequency at which the process of selecting RPs is executed. The communication controller 58A may use an intermediate value, the maximum value, or the minimum value, instead of the average value. Alternatively, the communication controller 58A may simply thin out the instant CoMP communication gains Gain_CoMP and transmit the CoMP communication gain at a frequency lower than the frequency at which the process of selecting RPs is executed. In addition, the CoMP communication gain may be defined for the system bandwidth or defined for each sub-bandwidth (sub-band). If the CoMP communication gain is defined for each sub-band, a variation in the frequency of the CoMP communication gain may be reflected.

Other configurations of the wireless stations according to the third embodiment are the same as or similar to the configurations of the wireless stations 50A to C illustrated in FIG. 7 according to the second embodiment. In addition, hardware configurations of the wireless stations according to the third embodiment are the same as or similar to the hardware configurations of the wireless stations 50A to C according to the second embodiment.

In addition, a functional configuration and hardware configuration of the wireless terminal according to the third embodiment are the same as or similar to the wireless terminal 70 illustrated in FIG. 8 according to the second embodiment.

Next, operations of the wireless communication system according to the third embodiment are described with reference to FIGS. 12 and 13.

An example of the JR operation of the wireless communication system according to the third embodiment is illustrated in FIG. 12. First, it is premised that, in the wireless communication system according to the third embodiment, the wireless stations 50A to C are installed as the communication points so as to be able to execute CoMP communication, as described above. The wireless station 50A is a wireless station connected to the wireless terminal 70 and executes the process of CoMP communication with the wireless stations 50B and 50C in an aggregated manner. Then, upon transmission of data from the wireless terminal 70, a receiving point to be actually used for coordinated reception of data is selected by the wireless station 50A from among the communication points 50A to C that are able to execute CoMP communication. In the example illustrated in FIG. 12, the wireless stations 50B and C are selected as selected wireless stations that actually execute the reception process, from among the wireless stations 50A to C. Specifically, the wireless station 50B is selected as a coordinating RP that coordinates with the RP of the connected cell. Then, a signal received by the wireless station 50B is transferred to the wireless station 50A, the joint processing (combining) is executed on the signal received by the wireless station 50B, and user data is acquired from the wireless terminal 70.

FIG. 13 is a sequence diagram describing operations of the wireless communication system according to the third embodiment. As illustrated in FIG. 13, the connected wireless station 50A transmits a downlink reference signal to the wireless terminal 70 (in S41). The downlink reference signal is an example of the second control signal related to a communication level between the connected wireless station 50A and the wireless terminal 70. Next, the wireless terminal 70 receives the downlink reference signal and calculates a path loss between the wireless terminal 70 and the connected wireless station 50A (in S42). Specifically, for example, the wireless terminal 70 measures downlink received power from the downlink reference signal and acquires an estimated value of the path loss based on the difference between the downlink transmission power and the downlink received power. Configuration information to be used to receive the downlink reference signal is notified to the wireless terminal 70 in advance or stored in the wireless terminal 70 in advance. In addition, information on the downlink transmission power is notified to the wireless terminal 70 in advance or stored in the wireless terminal 70 in advance. The process of calculating the path loss in S41 and S42 is executed when CoMP communication is prepared or at the predetermined control timing, for example.

Next, the wireless terminal 70 transmits an uplink reference signal (in S43). Control information to be used to transmit the uplink reference signal is notified to the wireless terminal 70 in advance or stored in the wireless terminal 70 in advance. The, the wireless stations 50A to C that are able to execute CoMP communication receive the uplink reference signal from the wireless terminal 70. Control information to be used to receive the uplink reference signal by the wireless stations 50A to C is notified to the wireless stations 50A to C in advance or stored in the wireless stations 50A to C in advance.

Next, the wireless stations 50A to C receive the uplink reference signal and measure received power (in S44 to S46). Next, the coordinating wireless stations 50B and C notify the connected wireless station 50A of the measured received power (in S47 and S48). Next, the connected wireless station 50A selects the receiving points (RPs) (RP of the connected cell and the coordinating RPs) based on the received power of the wireless stations 50A to C (in S49). As the coordinating RPs or RPs from which an effect of the CoMP reception may be expected, RPs of which received power is different by a predetermined threshold or smaller from the received power of the RP of the connected cell are selected. Since the selection of the RPs is executed on the side of the wireless station and the network based on instant communication levels, the selection of the RPs may be executed at a relatively shorter time interval than handover or the like, for example. The RPs may not be selected from among an overall RP set able to execute CoMP and may be selected from among a candidate RP set among the RP set able to execute CoMP.

Next, the wireless station 50A transmits received RP information to the selected RPs (in S50). For example, as illustrated in FIG. 12, if the coordinating wireless station 50B (RP 2) is selected as a coordinating RP, the received RP information is transmitted from the connected wireless station 50A to the coordinating wireless station 50B. This switches to the RPs.

Next, the connected wireless station 50A updates the CoMP communication gain (JR gain) in the JR operation (in S51). Specifically, for example, the connected wireless station 50A calculates differences between the total of the received power of the RPs (the RP of the connected cell and the coordinating RPs) that execute the coordinated reception in the JR operation and the received power of the RP of the connected cell and treats, as a new JR gain, an average value of the calculated values for a predetermined time period before the selection timing. The RP switching process of S43 to S51 is executed periodically or non-periodically, for example. In this case, the RP switching process is executed at the frequency F1 equal to or lower than a frequency at which the CoMP reception process of S53 to S58 described later is executed.

Next, the connected wireless station 50A transmits the JR gain to the wireless terminal 70 (in S52). The JR gain is an example of the first control signal related to communication levels between the selected wireless stations 50A and B and the wireless terminal 70. The gain transmission process of S52 is executed periodically or non-periodically, for example. In this case, the gain transmission process is executed at the frequency F2 lower than the frequency F1 at which the RP switching process is executed. Specifically, the gain transmission process of S52 is not executed for each time of the RP switching process and is skipped until the next execution timing. Thus, an increase in signaling may be suppressed, compared with a case where the JR gain is sequentially notified in coordination with the timing of selecting RPs at relatively short time intervals.

Next, in S53 to S58, the CoMP reception process is executed. Specifically, the wireless terminal 70 calculates transmission power of an uplink data signal. The uplink transmission power is calculated using the path loss calculated in S42 and the JR gain received in S52 according to the aforementioned Equation (2), for example. In this manner, by receiving a value representing characteristics of the communication levels between the selected RPs and the wireless terminal 70 and determining the transmission power, the transmission power may be appropriately set so as to ensure that path losses of the RPs to be actually used for the reception process are compensated for.

Next, the wireless terminal 70 transmits the uplink data signal using the transmission power calculated in S53 (in S54). Then, the wireless stations 50A and B receive the uplink data signal from the wireless terminal 70 (in S55 and S56). Next, the wireless station 50B transfers the data signal to the wireless station 50A (in S57). The wireless station 50A executes the joint processing (combining) so as to combine the data signal transferred from the wireless station 50B with the data signal received by the wireless station 50A and acquires user data from the wireless terminal 70. In this case, since the uplink data signal is transmitted with the transmission power appropriately set in S53 in S54, a reduction in inter-point interference and the improvement of the strength of the received signal are achieved and the communication performance of CoMP communication is improved. The CoMP reception process of S53 to S56 is repeated periodically or non-periodically until the next timing of at least any of the path loss calculation process of S41 and S42, the RP switching process of S43 to S51, and the gain transmission process of S52.

According to the third embodiment, in the wireless communication system that executes CoMP communication, transmission power of a signal to be transmitted from the wireless terminal may be appropriately controlled and the communication performance may be improved.

According to the third embodiment, in the wireless communication system that executes CoMP communication, the communication performance may be improved.

In the first to third embodiments, the wireless communication system may achieve the wireless stations 10A to C and the wireless stations 50A to C as base stations, for example. In this case, for example, the wireless stations 10A to C and the wireless stations 50A to C may be achieved as evolved nodes B (eNodeBs). Alternatively, in the first to third embodiments, the wireless communication system may achieve the wireless stations 10A and 50A as control units of base stations and achieve the wireless stations 10B, 10C, 50B, and 50C as remote units of the base stations, for example. In this case, the control units may be achieved as centralized eNodeBs, and the remote units may be achieved as remote radio heads (RRHs) included in the centralized eNodeBs, for example. For example, the control units are connected to the remote units through wired connections such as optical cables. The control units form cells, while the remote units form cover areas overlapping the cells. In this case, the control units and the remote units may use common cell identification information.

In addition, in the first to third embodiments, the wireless communication system includes the three wireless stations 10A to C or the three wireless stations 50A to C, but is not limited to this, and the number of wireless stations is arbitrary.

In addition, the wireless communication system according to the first to third embodiments may be achieved as an LTE-A system and may be applied to a wireless communication system using a communication scheme other than LTE-A.

In addition, the first to third embodiments are applicable to a mobile terminal such as a mobile phone, a smartphone, or a personal digital assistant (PDA) as the wireless terminal. In addition, the first to third embodiments are applicable to any of various communication devices that are mobile relay stations or the like and configured to execute communication with base stations as the wireless terminal other than the mobile terminal.

In addition, the first to third embodiments are applicable to base stations of various sizes such as macro base stations, pico base stations, femto base stations as the wireless stations. In addition, the first to third embodiments are applicable to various communication devices that are relay stations or the like and configured to execute communication with mobile stations as the wireless stations other than the base stations.

In addition, specific details of the separation and integration of the constituent elements of the wireless stations and wireless terminal are not limited to the first to third embodiments, and all or a part of them may be functionally or physically separated or integrated on an arbitrary basis based on loads and usage statuses of the elements. For example, a memory may be connected as an external device of the wireless terminal through a network and a cable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication method comprising:
   transmitting from a wireless terminal an uplink reference signal with a transmission power determined based on a downlink received power or quality, measured by the wireless terminal, of only a downlink reference signal transmitted from a connected wireless station that is one of a plurality of wireless stations that is connected to the wireless terminal;
   receiving by the wireless terminal a first control signal from the connected wireless station, the first control signal indicating at least one difference or ratio between a first uplink received power or quality and at least one second uplink received power or quality, the first uplink received power or quality being measured based on the uplink reference signal received by the connected wireless station, the at least one second uplink received power or quality being measured based on the uplink reference signal received by at least one wireless station that is selected from among the plurality of wireless stations; and controlling, by the wireless terminal a transmission power of an uplink signal to the at least one wireless station that is selected from among the plurality of wireless stations based on the received first control signal.

2. The wireless communication method according to claim 1, wherein
the connected wireless station transmits the first control signal at a frequency lower than a frequency at which the at least one wireless station is selected.

3. The wireless communication method according to claim 1, wherein
the at least one wireless station selected from the plurality of the wireless stations performs coordinated multipoint (CoMP) reception.

4. The wireless communication method according to claim 1, wherein
the at least one wireless station selected from the plurality of the wireless stations is a wireless station selected for dynamic point selection (DPS) operation or are at least two wireless stations selected for joint reception (JR) operation.

5. The wireless communication method according to claim 1, wherein
the received power or quality being measured between the wireless terminal and at least one wireless station is a reception power between the wireless terminal and the at least one wireless station.

6. The wireless communication method according to claim 1, wherein
the connected wireless station is a wireless station that transmits a control signal to the wireless terminal using at least one of a dedicated control channel and a dedicated data channel.

7. A wireless communication system including a plurality of wireless stations and a wireless terminal, the wireless communication system comprising:
a wireless terminal configured to transmit an uplink reference signal with a transmission power determined based on a downlink received power or quality, measured by the wireless terminal, of only a downlink reference signal transmitted from a connected wireless station that is one of a plurality of wireless stations and that is connected to the wireless terminal;
the connected wireless station connected to the wireless terminal, and configured to transmit a first control signal to the wireless terminal, the first control signal indicating at least one difference or ratio between a first uplink received power or quality and at least one second uplink received power or quality, the first uplink received power or quality being measured based on the uplink reference signal received by the connected wireless station, the at least one second uplink received power or quality being measured based on an uplink reference signal received by at least one of the plurality of wireless station that is selected from among the plurality of wireless stations; and
the wireless terminal configured to receive the first control signal from the connected wireless station and
to control a transmission power of an uplink signal to the at least one of the plurality of wireless station that is selected from among the plurality of wireless stations based on the received first control signal.

8. A wireless station comprising:
a memory; and
a processor coupled to the memory and configured to:
control a connection with a wireless terminal;
receive from the wireless terminal, an uplink reference signal with a transmission power determined based on a downlink received power or quality, measured by the wireless terminal, of only a downlink reference signal transmitted from the wireless station that is one of a plurality of wireless stations and that is connected to the wireless terminal; and
transmit, the wireless terminal, a first control signal, the first control signal indicating at least one difference or ratio between a first uplink received power or quality and at least one second uplink received power or quality, the first uplink received power or quality being measured based on an uplink reference signal received by the wireless station, the at least one second uplink received power or quality being measured based on an uplink reference signal received by at least one other wireless station that is selected from among a plurality of wireless stations, the wireless terminal configured to receive the first control signal and control a transmission power of a transmission signal to the at least one other wireless station that is selected from among the plurality of wireless stations based on the received first control signal.

9. A wireless terminal comprising:
a memory; and
a processor coupled to the memory and configured to:
transmit an uplink reference signal with a transmission power determined based on a downlink received power or quality, measured by the wireless terminal, of only a downlink reference signal transmitted from a connected wireless station that is one of a plurality of wireless stations and that is connected to the wireless terminal;
receive a first control signal from the connected wireless station, the first control signal indicating at least one difference or ratio between a first uplink received power or quality and at least one second uplink received power or quality, the first uplink received power or quality being measured based on the uplink reference signal received by the connected wireless station, the at least one second uplink received power or quality being measured based on the uplink reference signal received by at least one wireless station that is selected from among the plurality of wireless stations; and
control, when the wireless terminal receives the first control signal, a transmission power of an uplink signal to the at least one wireless station that is selected from among the plurality of wireless stations based on the received first control signal.

* * * * *